(12) United States Patent
Tanaka

(10) Patent No.: US 10,979,584 B2
(45) Date of Patent: Apr. 13, 2021

(54) IMAGE FORMING DEVICE, INFORMATION PROCESSING DEVICE, DISPLAY CONTROL METHOD, AND NON-TRANSITORY COMPUTER-READABLE RECORDING MEDIUM STORING A PROGRAM FOR CONTROLLING DISPLAY OF POST-PROCESSING SETUP INFORMATION

(71) Applicant: KONICA MINOLTA, INC., Tokyo (JP)

(72) Inventor: Kazuto Tanaka, Ichikawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/731,149

(22) Filed: Dec. 31, 2019

(65) Prior Publication Data

US 2020/0244817 A1 Jul. 30, 2020

(30) Foreign Application Priority Data

Jan. 30, 2019 (JP) .............................. JP2019-014061

(51) Int. Cl.
*G06F 3/12* (2006.01)
*H04N 1/00* (2006.01)

(52) U.S. Cl.
CPC ......... *H04N 1/0044* (2013.01); *G06F 3/1207* (2013.01); *G06F 3/1208* (2013.01); *G06F 3/1256* (2013.01); *H04N 1/00031* (2013.01); *H04N 1/00411* (2013.01)

(58) Field of Classification Search
None
See application file for complete search history.

(56) References Cited

U.S. PATENT DOCUMENTS

| | | | | |
|---|---|---|---|---|
| 2007/0273914 | A1* | 11/2007 | Hosoda | G06F 3/1211 358/1.14 |
| 2007/0291286 | A1* | 12/2007 | Utsunomiya | G03G 15/502 358/1.8 |
| 2009/0225343 | A1* | 9/2009 | Tominaga | H04N 1/2369 358/1.9 |
| 2009/0244620 | A1* | 10/2009 | Takahashi | G06F 3/1285 358/1.15 |
| 2009/0279133 | A1 | 11/2009 | Nakatsuka | |

(Continued)

FOREIGN PATENT DOCUMENTS

JP 2009271793 A 11/2009

*Primary Examiner* — Dung D Tran
(74) *Attorney, Agent, or Firm* — Buchanan Ingersoll & Rooney PC

(57) ABSTRACT

An image forming device which permits easy adjustment of post-processing setup information. The image forming device includes: an image forming section which forms an image on recording paper; a storage which stores post-processing setup information as setup information for post-processing including trimming to be performed by a post-processing device on the recording paper on which the image has been formed by the image forming section; and a display controller which performs control for an adjustment screen of a display section to show some of the setup items included in the post-processing setup information when test printing according to a printing job to which the post-processing setup information is applied is conducted.

6 Claims, 18 Drawing Sheets

(56) References Cited

U.S. PATENT DOCUMENTS

| | | | | |
|---|---|---|---|---|
| 2013/0120799 A1* | 5/2013 | Maeda | ................. | G06F 3/1255 |
| | | | | 358/1.15 |
| 2015/0212766 A1* | 7/2015 | Mutsuno | ............... | G06F 3/1259 |
| | | | | 358/1.14 |
| 2015/0241829 A1* | 8/2015 | Wakai | .................... | G03G 15/50 |
| | | | | 399/72 |
| 2016/0070223 A1* | 3/2016 | Yamakawa | ........ | G03G 15/6538 |
| | | | | 399/82 |
| 2018/0113655 A1* | 4/2018 | Sawata | ................. | G06F 3/1232 |
| 2019/0255839 A1* | 8/2019 | Izawa | .................. | B41J 2/04586 |
| 2019/0278531 A1* | 9/2019 | Yamaguchi | ........ | H04N 1/00474 |

* cited by examiner

| NO | POST-PROCESSING | PRODUCT | CD TRIMMING SECTION | THIRD POST-PROCESSOR | SECOND POST-PROCESSOR | FD TRIMMING SECTION |
|---|---|---|---|---|---|---|
| 1 | (1) FOUR-SIDE TRIMMING | SHEET FLYER HANDOUT BANNER | CD TRIMMING | DUMMY, ETC. | DUMMY, ETC. | TOP/BOTTOM SLITTING |
| 2 | (2) MULTIPLE TRIMMING | (INCL. FOLDING) BANNER BOOK COVER LEAFLET | CD TRIMMING | DUMMY, ETC. | DUMMY, ETC. | TOP/BOTTOM SLITTING |
| 3 | (1) FOUR-SIDE TRIMMING & (3) CREASING | CATALOG BROCHURE PHOTO ALBUM BOOKLET | CD TRIMMING | DUMMY, ETC. | CREASING | TOP/BOTTOM SLITTING |
| 4 | (1) FOUR-SIDE TRIMMING & (4) PERFORATING | SHEET FLYER HANDOUT | CD TRIMMING | FD PERFORATING | CD PERFORATING | TOP/BOTTOM SLITTING |
| 5 | (1) FOUR-SIDE TRIMMING & (3) CREASING | TWO-FOLD CARDS SHOPPING CARD GREETING CARD STAMP CARD INVITATION LETTER | CD TRIMMING | BLEED SLITTING | CREASING | TOP/BOTTOM SLITTING |
| 6 | (2) MULTIPLE TRIMMING (CARD) | CARDS SHOPPING CARD GREETING CARD STAMP CARD INVITATION LETTER | CD TRIMMING | BLEED SLITTING | DUMMY, ETC. | TOP/BOTTOM SLITTING |
| 7 | (2) MULTIPLE TRIMMING (NAME CARD) | NAME CARD /OTHER CARDS | CD TRIMMING | BLEED SLITTING | DUMMY, ETC. | TOP/BOTTOM SLITTING |
| 8 | (2) MULTIPLE TRIMMING & (4) PERFORATING | TICKET COUPON | CD TRIMMING | FD PERFORATING | CD PERFORATING | TOP/BOTTOM SLITTING |

- - - - - - TRIMMING/SLITTING
━━━━━ CREASING
·········· PERFORATING

PROFILE CREATION

← TRANSPORTATION DIRECTION

| 1 | 2 | 3 | 4 |
|---|---|---|---|
| 5 | 6 | 7 | 8 |

SETUP INFORMATION

| SHEET SIZE | 297 × 210 |
| TRIMMING TYPE | DETAILED |

TRIMMING

| FINISHED SIZE (WIDTH) | 55 [mm] | |
| FINISHED SIZE (LENGTH) | 91 [mm] | |
| TIP POSITION | 30 [mm] | |
| UPPER END POSITION | 10 [mm] | |
| NO. OF PAGES (HORIZONTAL) | 4 | ☐ Auto |
| NO. OF PAGES (VERTICAL) | 2 | ☐ Auto |
| CREASING POSITION 1 | 10 [mm] | ☑ INVALID |
| BLEEDING WIDTH (HORIZONTAL) | 8 [mm] | ☐ INVALID |
| BLEEDING WIDTH (VERTICAL) | 5 [mm] | ☐ INVALID |

( PROFILE COMPLETED )  ( CANCEL )

IMAGE FORMING DEVICE, INFORMATION PROCESSING DEVICE, DISPLAY CONTROL METHOD, AND NON-TRANSITORY COMPUTER-READABLE RECORDING MEDIUM STORING A PROGRAM FOR CONTROLLING DISPLAY OF POST-PROCESSING SETUP INFORMATION

CROSS-REFERENCE TO RELATED APPLICATIONS

The entire disclosure of Japanese Patent Application No. 2019-14061, filed on Jan. 30, 2019, is incorporated herein by reference in its entirety.

BACKGROUND

Technological Field

The present invention relates to an image forming device, an information processing device, a display control method, and a non-transitory computer-readable recording medium storing a program.

Description of the Related Art

Conventionally, a post-processing profile (post-processing setup information) as setup information for a post-processing device has been used to control various setup items such as image size, trimming position, and creasing and perforating positions. The set values of these setup items can be adjusted, for example, in millimeters. The user can obtain the post-processing finish of printed matter matched to his/her own preference by adjusting the set values of the desired post-processing items.

However, in some cases, even if post-processing is performed using the same post-processing setup information, the post-processing finish varies depending on the model, etc. of the image forming device or post-processing device. If the post-processing finish does not match the finish desired by the user, the user can correct the setup items in the post-processing setup information through an adjustment screen or the like.

For example, Patent Literature 1 (JP-A-2009-271793) discloses a technique in which the information on the setup item for which the user has made a fine adjustment for each device, and the amount of adjustment is recorded in JDF (Job Definition Format) and a file storage manager holds the JDF data so that the JDF data can be used for reprinting.

CITATION LIST

Patent Literature

Patent Literature 1: JP-A-2009-271793

SUMMARY

However, one problem is that, for the user who has checked the finish of the printed matter subjected to post-processing and determined to adjust the set values of setup items in the post-processing setup information, it is difficult for the user to determine which setup item among the various setup items should be adjusted.

The present invention has been made in view of the above circumstances and an object of the present invention is to ensure that adjustment of post-processing setup information can be made easily.

To achieve the abovementioned object, according to an aspect of the present invention, an image forming device reflecting one aspect of the present invention comprises: an image forming section which forms an image on recording paper; a storage which stores post-processing setup information as setup information for post-processing, including trimming, to be performed by a post-processing device on the recording paper on which the image has been formed by the image forming section; and a display controller which causes an adjustment screen of a display section to show some of setup items included in the post-processing setup information when test printing according to a printing job to which the post-processing setup information is applied is conducted by the image forming section.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention;

FIG. 3 is a table which shows an example of types of post-processing to be performed by the post-processing device according to the first embodiment of the present invention;

FIG. 4 is a diagram which shows an example of the post-processing profile creation screen according to the first embodiment of the present invention;

FIG. 6 is a diagram which shows an example of the output mode selection screen according to the first embodiment of the present invention;

DETAILED DESCRIPTION OF EMBODIMENTS

Hereinafter, embodiments of the present invention will be described with reference to the appended drawings. However, the scope of the invention is not limited to the disclosed embodiments. In this specification and drawings, constituent elements which have substantially the same functions or structures are designated by the same reference signs and their description is not repeated. First, prior to explaining examples of the configurations of various embodiments, the above problem to be solved by the present invention will be explained more concretely.

First Embodiment

[Configuration of the Image Forming System]

Figure 1:
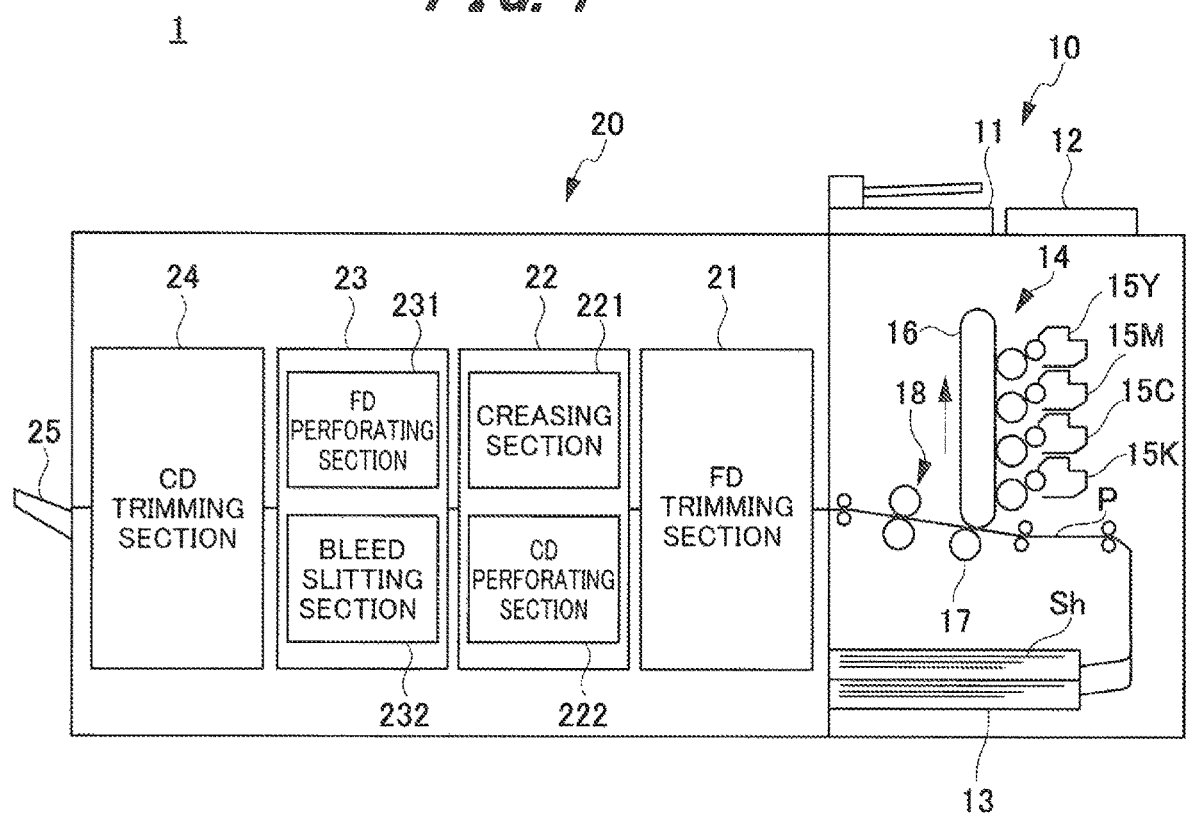
FIG. 1 is a schematic configuration diagram of the image forming system according to a first embodiment of the present invention.

First, an example of the configuration of an image forming system according to a first embodiment of the present invention will be described, referring to FIG. 1. FIG. 1 is a schematic configuration diagram of an image forming system 1 according to the first embodiment of the present invention.

The image forming system 1 shown in FIG. 1 includes an image forming device 10 and a post-processing device 20. First, the configuration of the image forming device 10 is described below. As shown in FIG. 1, the image forming device 10 includes a scanner 11, an operation display section 12, a paper feed tray 13, and a printer 14 (an example of the image forming section).

The scanner 11 optically reads an image from an original placed on an original holder and makes A/D conversion of the read image to generate image data (scan data).

The operation display section 12 includes a display section as a liquid crystal panel or the like and an operation section as a touch sensor or the like, and the display section and operation section are integrated as a touch panel. Alternatively, a mouse or a tablet may be used as the operation section so that the operation section and the display section are separate from each other.

Figure 2:
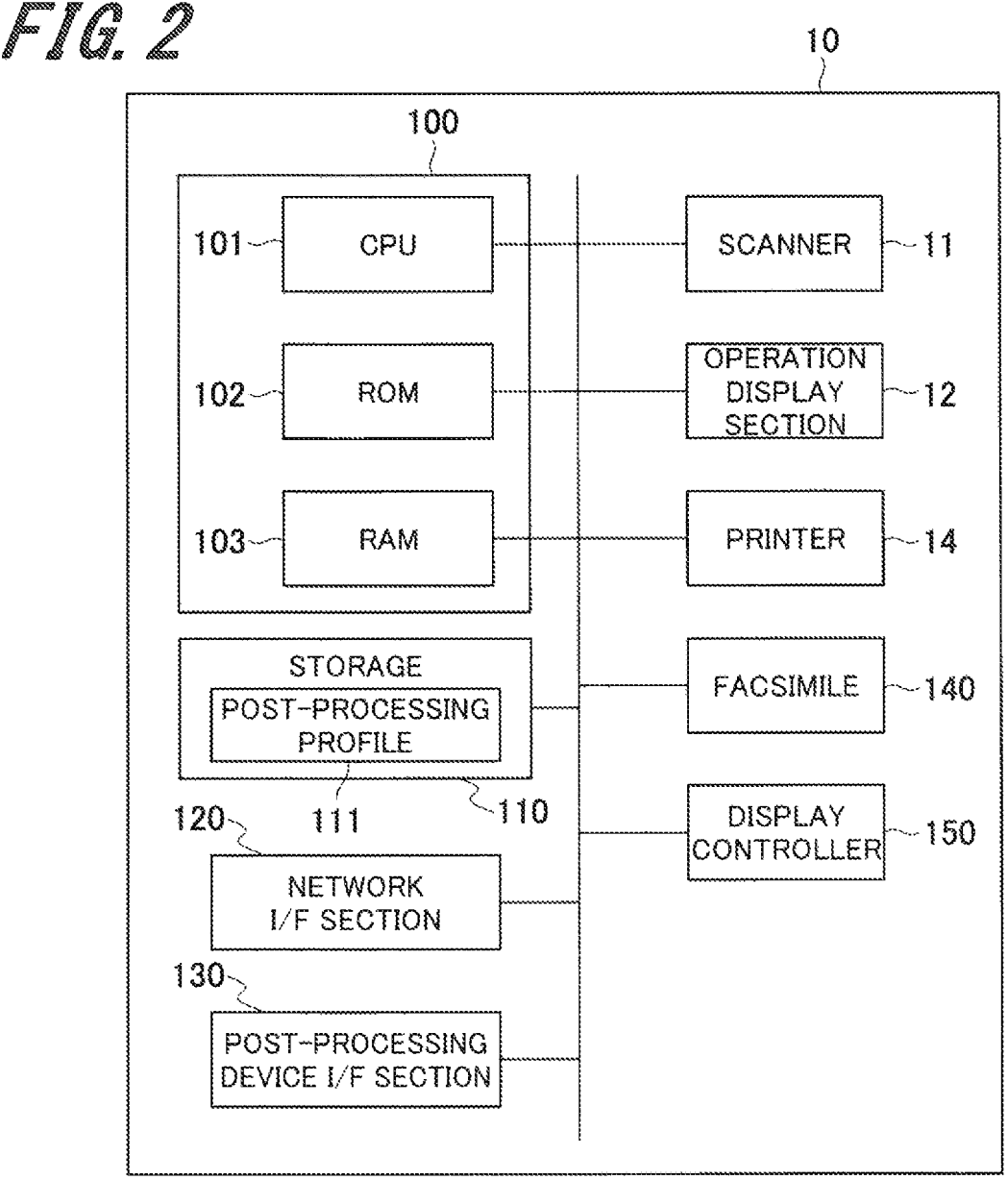
FIG. 2 is a block diagram which shows an example of the configuration of the control system of the image forming device according to the first embodiment of the present invention.

The operation display section 12 generates an operation signal representing the content of an operation command entered by the user through the operation section and sends the operation signal to the controller 100 (see FIG. 2). For example, when the user enters an operation command to start the image forming process, the operation display section 12 generates a signal to start the image forming process and sends it to the controller 100. In addition, the operation display section 12 displays, on the display section, an adjustment screen or the like which enables adjustment of the post-processing setup profile (an example of post-processing setup information) applied to the printing job under the control by a display controller 150.

The paper feed tray 13 is a container which houses a sheet Sh on which an image is formed by the printer 14. The sheet Sh supplied from the paper feed tray 13 is passed through a transportation path P and transported to the printer 14.

The printer 14 includes four image forming units 15Y, 15M, 15C, and 15K to form yellow, magenta, cyan, and black toner images respectively. The image forming units 15Y, 15M, 15C, and 15K each include an electrifying section (not shown), an LED write unit (laser light source) (not shown), a photoreceptor drum, and a developing section. The developing section forms a latent image on the surface (outer circumference) of the photoreceptor drum and causes the toner supplied from a developing device (not shown) to adhere to the latent image. Consequently, a toner image is formed on the photoreceptor drum.

Furthermore, the printer 14 includes an intermediate transfer belt 16, a secondary transfer section 17, and a fixing section 18. The intermediate transfer belt 16 is a belt to which the toner images formed on the photoreceptor drums for different colors are primarily transferred. The secondary transfer section 17 is a roller which secondarily transfers the toner images of different colors primarily transferred to the intermediate transfer belt 16, to the sheet Sh transported on the transportation path P.

The fixing section 18 performs the fixing process to fix the toner image transferred to the sheet Sh by the secondary transfer section 17, on the sheet Sh. The sheet Sh on which the toner image has been fixed by the fixing section 18 is transported on the transportation path P to the post-processing device 20.

Next, the configuration of the post-processing device 20 will be described. The post-processing device 20 includes an FD trimming section 21, a second post-processor 22, a third post-processor 23, a CD trimming section 24, and a paper delivery tray 25.

The FD trimming section 21 performs the process to trim the sheet Sh transported from the image forming device 10 in the paper transportation direction (hereinafter also called the FD (Feed Direction) direction) and the process to make a slit in the sheet Sh in the FD direction (top-bottom slit). The second post-processor 22 includes a creasing section 221 and a CD perforating section 222. The creasing section 221 makes a crease in the sheet Sh. The CD perforating section 222 perforates the sheet Sh in the direction perpendicular to the FD direction (hereinafter also called the CD direction (Cross Direction)).

The third post-processor 23 includes an FD perforating section 231 and a bleed slitting section 232. The FD perforating section 231 perforates the sheet Sh in the FD direction. The bleed slitting section 232 bleeds the sheet Sh in the FD direction. The CD trimming section 24 trims the sheet Sh in the CD direction. The paper delivery tray 25 is a tray to which a sheet having an image formed by the image forming device 10 is delivered.

In the image forming system 1 according to the present embodiment, the post-processing device 20 with a trimming function is connected after the image forming device 10, so a series of processing steps from image formation on the sheet Sh to post-processing can be performed by the image forming system 1.

For example, in a conventional system in which the image forming device 10 and a trimming (paper cutting) machine are not connected, the following steps are required for the process from image formation on the sheet Sh to post-processing.

(1) The user makes settings for the image forming device 10.
(2) The image forming device 10 forms an image on a sheet and outputs the sheet with the image formed thereon.
(3) The user carries the output (sheet) from the image forming device 10 to the trimming machine.
(4) The user makes settings for the trimming machine.
(5) The trimming machine performs trimming.
(5') The user again makes settings for the trimming machine according to the result of test trimming.
(6) The trimming machine performs trimming.

On the other hand, in the image forming system 1 according to the present embodiment, a series of processing steps from image formation on the sheet Sh to post-processing including trimming are performed by the following procedure.

(1) The user makes settings for the image forming device 10 and settings for the post-processing device 20 with a trimming function (settings for a post-processing profile).
(2) The image forming system 1, which includes the image forming device 10 and the post-processing device 20, conducts test printing.
(2') The user again makes settings for the image forming device 10 according to the result of test printing and/or again makes settings for the post-processing device 20.
(3) The image forming system 1 performs production printing and trimming.

In other words, according to the present embodiment, the user is relieved of the trouble of carrying the output from the image forming device 10 to the trimming machine and setting it.

[Example of the Configuration of the Control System of the Image Forming Device]

Next, an example of the configuration of the control system of the image forming device 10 of the image forming system 1 will be described referring to FIG. 2. FIG. 2 is a block diagram which shows an example of the configuration of the control system of the image forming device 10.

As shown in FIG. 2, the image forming device 10 includes a controller 100, a storage 110, a network I/F section 120, a post-processing device I/F section 130, the scanner 11, the operation display section 12, the printer 14, a facsimile 140, and the display controller 150.

The controller 100 includes a CPU (Central Processing Unit) 101, a ROM (Read Only Memory) 102, and a RAM (Random Access Memory) 103.

The CPU 101 controls operation of each section which constitutes the image forming device 10. For example, the CPU 101 changes the content of the post-processing setup profile according to the instruction from the user concerning the content of the adjustment screen displayed on the operation display section 12.

The ROM 102 stores the program (software) for the CPU 101 to perform arithmetic processing. The RAM 103 is used as a working area for the CPU 101 to execute the program.

The storage 110 is, for example, an HDD (Hard Disk Drive), an SSD (Solid State Drive) or the like. The storage 110 stores a post-processing profile 111. The post-processing profile 111 is setup information for post-processing to be performed by the post-processing device 20, which includes setup items for post-processing tasks such as top-bottom slitting, creasing, and CD trimming and set values for these items.

The network I/F section 120 is a NIC (Network Interface Card), a modem or the like which is connected to the public circuit (not shown) or the like. The network I/F section 120 receives original data or the like sent from a terminal or the like (not shown) which is operated by the user.

The post-processing device I/F section 130 is, for example, a serial interface and connected to the post-processing device 20. The post-processing device I/F section 130 controls transmission and reception of various data such as the post-processing profile 111 and signals with the post-processing device 20.

The scanner 11, operation display section 12, and printer 14 have already been described above referring to FIG. 1 and their description is omitted here. The facsimile 140 sends the scan data read by the scanner 11 to the facsimile terminal (not shown) through the network I/F section 120 and receives the image data sent from the facsimile terminal and sends it to the printer 14.

The display controller 150 performs control for the operation display section 12 to display a screen such as an operation screen according to the operation command entered by the user through the operation display section 12. For example, the display controller 150 performs control for the operation display section 12 to display an adjustment screen when the printer 14 conducts test printing according to the printing job to which the post-processing profile 111 is applied. At this time, the display controller 150 changes the content shown on the adjustment screen according to information about whether production printing for the printing job has been completed or not. Specifically, if production printing has been completed, the display controller 150 performs control for the adjustment screen to show some of the setup items included in the post-processing profile 111. If production printing has not been completed, the display controller 150 performs control for the adjustment screen to show all the setup items included in the post-processing profile 111.

[Types of Post-Processing Performed by the Post-Processing Device]

Next, types of post-processing performed by the post-processing device 20 will be described referring to FIG. 3. FIG. 3 is a table which shows an example of types of post-processing which is performed by the post-processing device.

The table of FIG. 3 shows eight types of post-processing, No. 1 to No. 8. No. 1 represents "(1) four-side trimming"; No. 2 represents "(2) multiple trimming"; and No. 3 represents "(1) four-side trimming & (3) creasing". No. 4 represents "(1) four-side trimming & (4) perforating"; No. 5 represents "(1) four-side trimming & (3) creasing"; and No. 6 represents "(2) multiple trimming (card). No. 7 represents "(2) multiple trimming (name card)"; and No. 8 represents "(2) multiple trimming & (4) perforating".

For example, No. 1 "(1) four-side trimming" and No. 2 "multiple trimming" are post-processing types which are used to produce sheets, flyers, handouts, banners and the like. In No. 1 "(1) four-side trimming", the FD trimming section 21 (see FIG. 1) FD-trims both ends of the sheet SH and then the CD trimming section 24 CD-trims both ends of the sheet Sh.

For example, No. 3 "(1) four-side trimming & (3) creasing" is a post-processing type which is used to produce banners, book covers, leaflets, catalogs, brochures, photoalbums, booklets and the like. In No. 3 "(1) four-side trimming & (3) creasing", the FD trimming section 21 FD-trims both ends of the sheet Sh and then the creasing section 221 of the second post-processor 22 creases the sheet Sh. Then, the CD trimming section 24 CD-trims both ends of the sheet Sh.

For example, No. 4 "(1) four-side trimming & (4) perforating" is a post-processing type which is used to produce sheets, flyers, handouts and the like. In No. 4 "(1) four-side trimming & (4) perforating", the FD trimming section 21 FD-trims both ends of the sheet Sh and then the CD perforating section 222 of the second post-processor 22 perforates the sheet Sh in the CD direction. Then, the FD perforating section 231 of the third post-processor 23 perforates the sheet Sh in the FD direction and the CD trimming section 24 CD-trims both ends of the sheet Sh.

The type of post-processing to be performed for the sheet Sh by the post-processing device 20, processing positions on the sheet Sh for post-processing and so on are specified by the post-processing profile 111. The post-processing profile 111 is created by the user through the post-processing profile creation screen displayed on the operation display section 12 of the image forming device 10.

[Example of creation of a post-processing profile]

Next, an example of creation of a post-processing profile by the user will be described referring to FIG. 4. FIG. 4 is a diagram which shows an example of the post-processing profile creation screen.

As shown in FIG. 4, the post-processing file creation screen Sc1 shows "SETUP INFORMATION" and "TRIMMING" as setup items of the post-processing profile 111 on the right. As "SETUP INFORMATION", it is shown that the size of the sheet Sh is "297×210" and the type of trimming is "DETAILED".

In the "TRIMMING" field, setup items such as "FINISHED SIZE (WIDTH)", "FINISHED SIZE (LENGTH)", "TIP POSITION", "UPPER END POSITION", "NO. OF PAGES (HORIZONTAL)", "NO. OF PAGES (VERTICAL)", "CREASING POSITION 1", "BLEEDING WIDTH (HORIZONTAL)" and "BLEEDING WIDTH (VERTICAL)" and set values are shown.

The post-processing file creation screen Sc1 also shows the state of the sheet Sh which reflects the settings made in the TRIMMING field, on the left. The user can create the post-processing profile 111 by entering desired values for the setup items while checking the state of the sheet Sh reflecting the settings for post-processing.

On the other hand, adjustment of the post-processing profile 111 applied to the printing job is made by the user through the adjustment screen displayed on the operation display section 12 of the image forming device 10. The adjustment screen is displayed on the operation display section 12 under the control by the display controller 150 (see FIG. 2) during test printing or after test printing.

[Display Control by the Display Controller]

Figure 5:
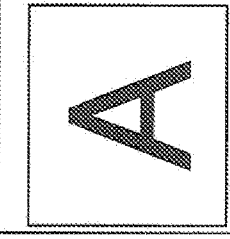
FIG. 5 is a diagram which shows an example of the job list screen according to the first embodiment of the present invention.
Figure 6:
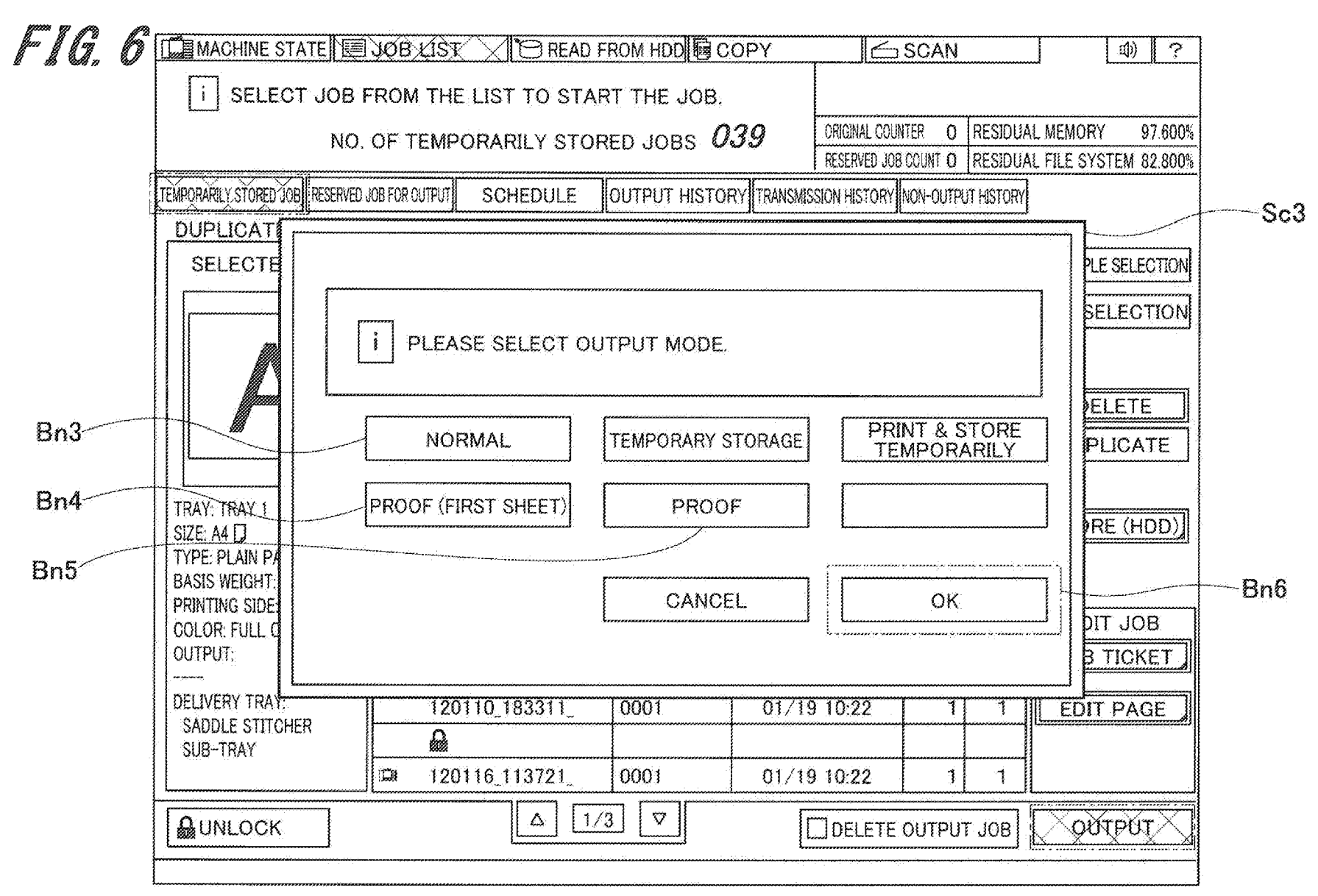
Figure 7:
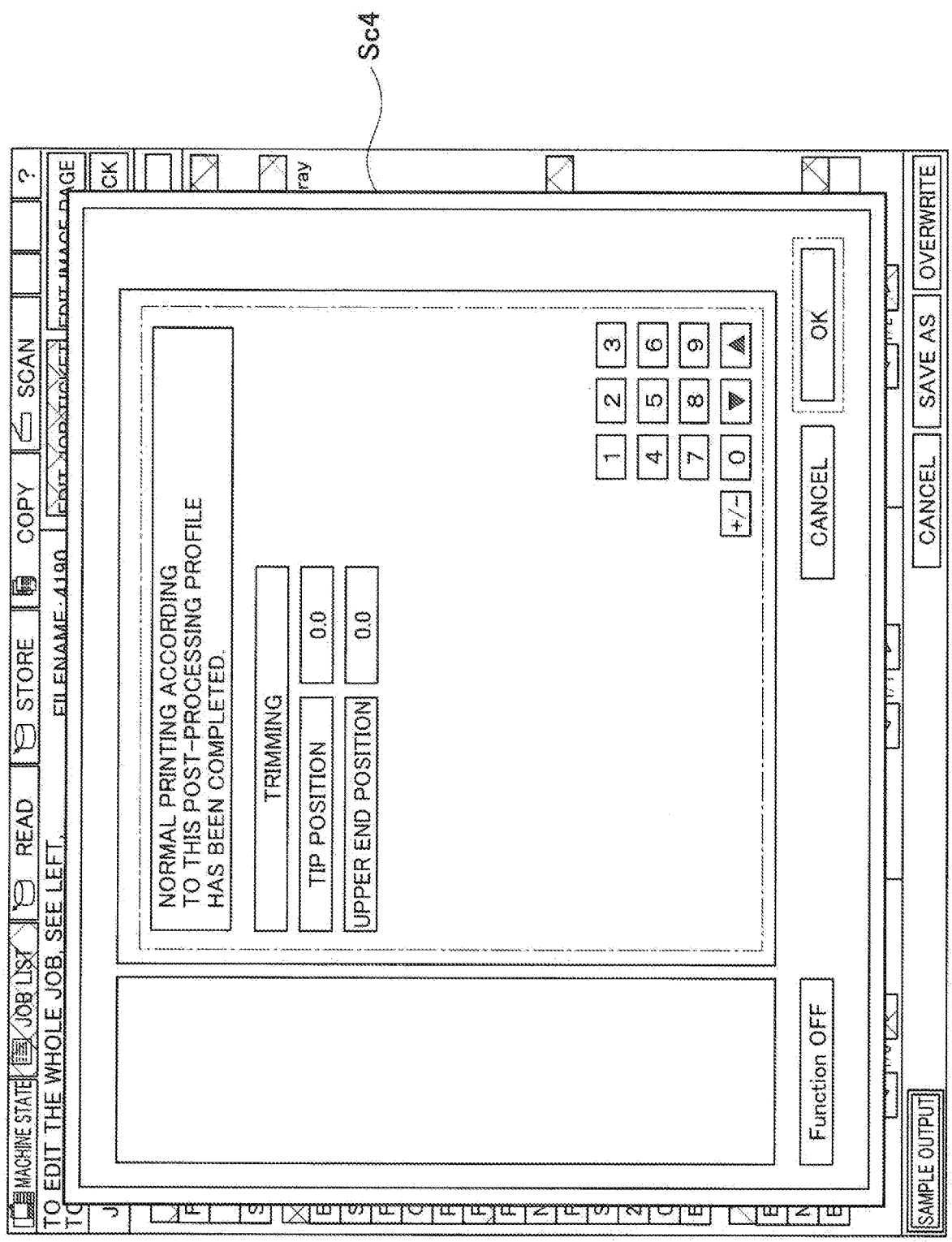
FIG. 7 is a diagram which shows an example of the adjustment screen which appears when production printing has been completed according to the first embodiment of the present invention.
Figure 8:
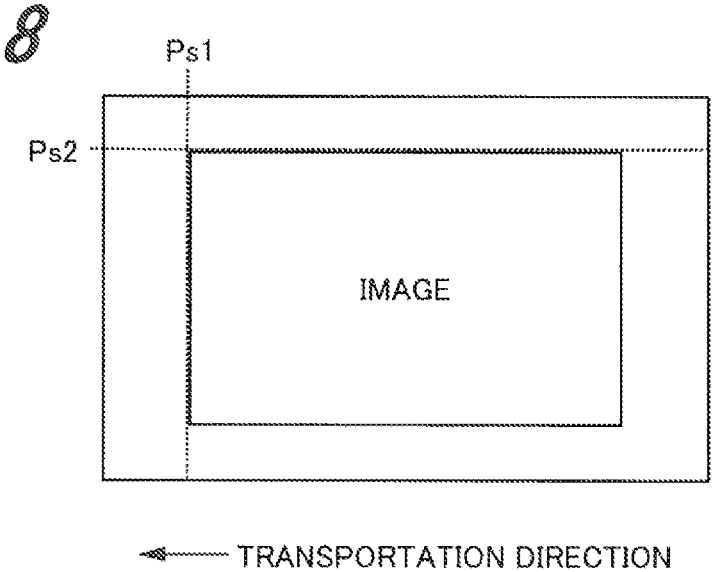
FIG. 8 is a diagram which explains the tip position and upper end position in the setup items of the post-processing profile according to the first embodiment of the present invention.
Figure 9:
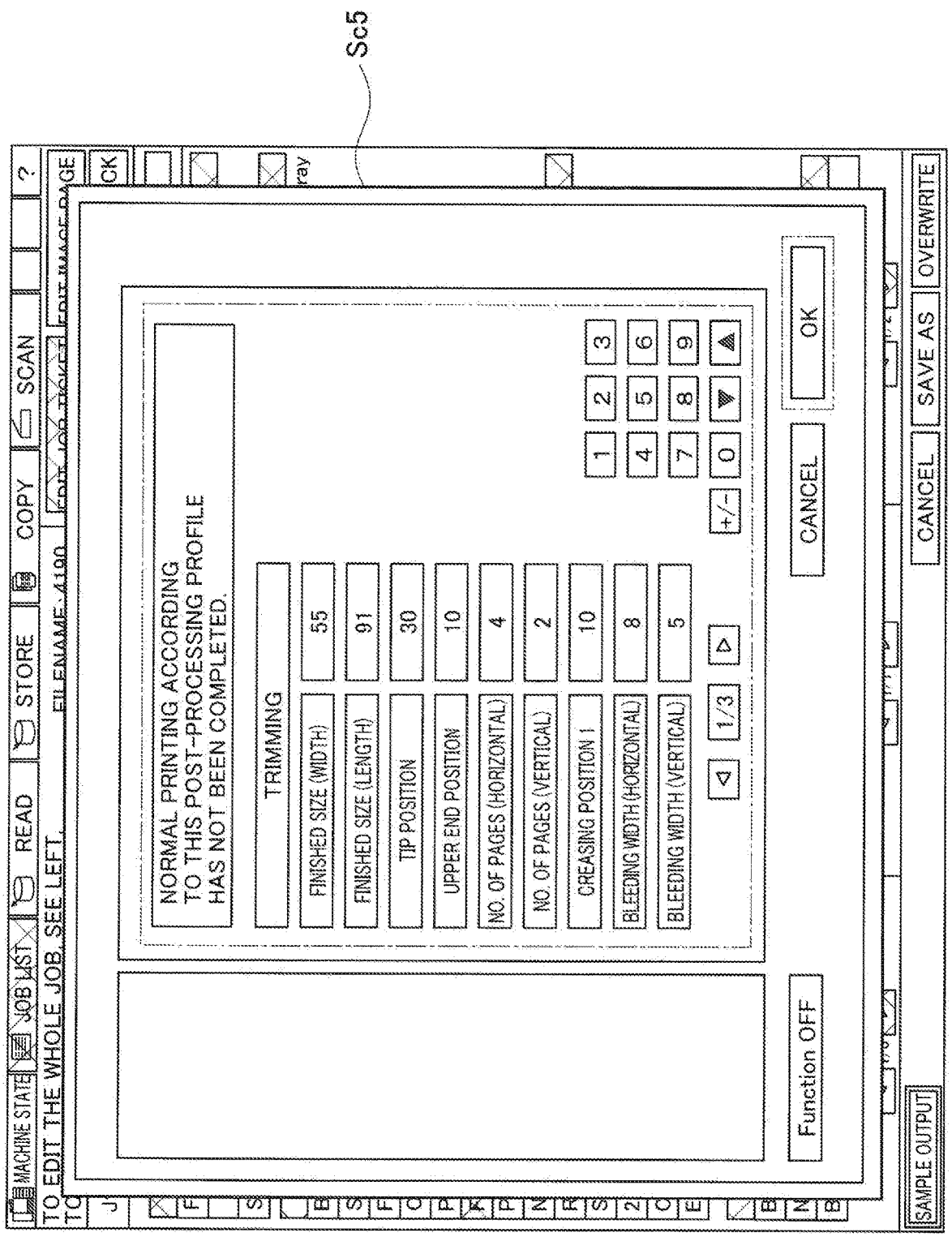
FIG. 9 shows an example of the adjustment screen which appears when production printing has not been completed according to the first embodiment of the present invention.

Next, how the display controller 150 performs display control for the adjustment screen will be described referring to FIGS. 5 to 9. FIG. 5 shows an example of the job list screen and FIG. 6 shows an example of the output mode selection screen. FIG. 7 shows an example of the adjustment screen which appears when production printing has been completed. FIG. 8 is a diagram which explains the tip position and upper end position in the setup items of the post-processing profile. FIG. 9 shows an example of the adjustment screen which appears when production printing has not been completed When test printing or production printing is desired, the user first enters a command (operation) for the operation display section 12 to display the job list screen Sc2 shown in FIG. 5 through the operation section of the operation display section 12. The display controller 150 performs control for the operation display section 12 to display the job list screen Sc2 according to the command.

As the user presses the TEMPORARILY STORED JOB button Bn1 on the job list screen Sc2, the display controller 150 performs control to show the temporarily stored jobs stored in the storage 110, etc. of the image forming device 10 as a temporarily stored job list Lt on the screen.

The user can give an instruction to perform printing for the selected printing job by selecting the desired printing job for test printing or production printing from the temporarily stored job list Lt and pressing the OUTPUT button Bn2 in the right lower corner of the screen.

As the user presses the OUTPUT button Bn2, the display controller 150 performs control to display the output mode selection screen Sc3 as a popup window as shown in FIG. 6. In the upper area of the output mode selection screen Sc3, the message "PLEASE SELECT OUTPUT MODE" is shown and under the message, the NORMAL button Bn3, PROOF (FIRST SHEET) button Bn4, PROOF button Bn5 and other buttons are shown.

The NORMAL button Bn3 is a button which accepts a command for production printing output and the PROOF (FIRST SHEET) button Bn4 is a button which accepts a command to print only the first sheet for test printing and stop printing. The PROOF button Bn5 is a button which accepts a command to print only the first copy for test printing and stop printing.

After the user presses (selects) one of the NORMAL button Bn3, PROOF (FIRST SHEET) button Bn4 and PROOF button Bn5, if the user presses the OK button Bn6 at the right bottom of the output mode selection screen Sc3, the display controller 150 sends the information on the printing mode selected by the user to the controller 100 (see FIG. 2). Then, the controller 100 instructs the printer 14 to perform printing in the printing mode selected by the user.

If the user presses the PROOF (FIRST SHEET) button Bn4, the display controller 150 performs control to display the adjustment screen as a popup window after output of the first sheet in test printing. If the user presses the PROOF button Bn5, the display controller 150 performs control to display the adjustment screen as a popup window during test printing or in the case of test printing of one sheet, after output of the sheet.

Upon detecting that the user has pressed the PROOF (FIRST SHEET) button Bn4 or PROOF button Bn5, the display controller 150 determines whether production printing has already been completed according to the printing job including test printing or not. The information about whether production printing has already been completed according to the printing job including test printing or not is given according to whether the production printing completion flag (not shown) is set or not in the post-processing profile 111.

If the production printing completion flag is set, the display controller 150 determines that production printing for the printing job including test printing has been completed and performs control for the operation display section 12 to display the adjustment screen Sc4 as shown in FIG. 7. The message "NORMAL PRINTING ACCORDING TO THIS POST-PROCESSING PROFILE HAS BEEN COMPLETED" appears in the upper area of the adjustment screen as shown in FIG. 7. Under the message, only two setup items, namely "TIP POSITION" and "UPPER END POSITION", appear as setup items in the "TRIMMING" field.

Referring to FIG. 8, "TIP POSITION" and "UPPER END POSITION" as setup items in the post-processing profile 111 are described below. FIG. 8 is a diagram which explains the tip position and upper end position as setup items in the post-processing profile 111. As shown in FIG. 8, tip position Ps1 is the position of the side (an example of the first side) at the front end (left in the figure) in the FD direction as one of the sides of the image formed on the sheet Sh which are parallel to the CD direction, perpendicular to the FD direction. Upper end position Ps2 is the position of the side (an example of the second side) on the farther side (upper side in the figure) as one of the sides of the image formed on the sheet Sh which are parallel to the FD direction.

As an adjustment of the post-processing profile 111 after completion of production printing, a fine adjustment is often made to correct slight sheet misalignment attributable to the individual difference of the image forming device 10 or the like. In the present embodiment, since only "TIP POSITION" and "UPPER END POSITION" are shown as setup items on the adjustment screen after completion of production printing, the user can easily make the fine adjustment of the post-processing profile 111 which is required after completion of production printing.

On the other hand, if the production printing completion flag is not set, the display controller 150 determines that production printing according to the printing job including test printing has not been completed and performs control to display the adjustment screen Sc5 as shown in FIG. 9. The message "NORMAL PRINTING ACCORDING TO THIS POST-PROCESSING PROFILE HAS NOT BEEN COMPLETED" appears in the upper area of the adjustment screen Sc5 as shown in FIG. 9. Under the message, all the setup items included in the post-processing profile 111 are shown as setup items in the "TRIMMING" field. Therefore, the user can freely change the values for the desired setup items while production printing is not completed.

[Display Control Method in the Image Forming Device]

Next, the display control method in the image forming device 10 will be described referring to FIGS. 10 to 14. FIGS. 10 to 14 are flowcharts which show an example of the sequence of the display control method in the image forming device 10.

Figure 10:
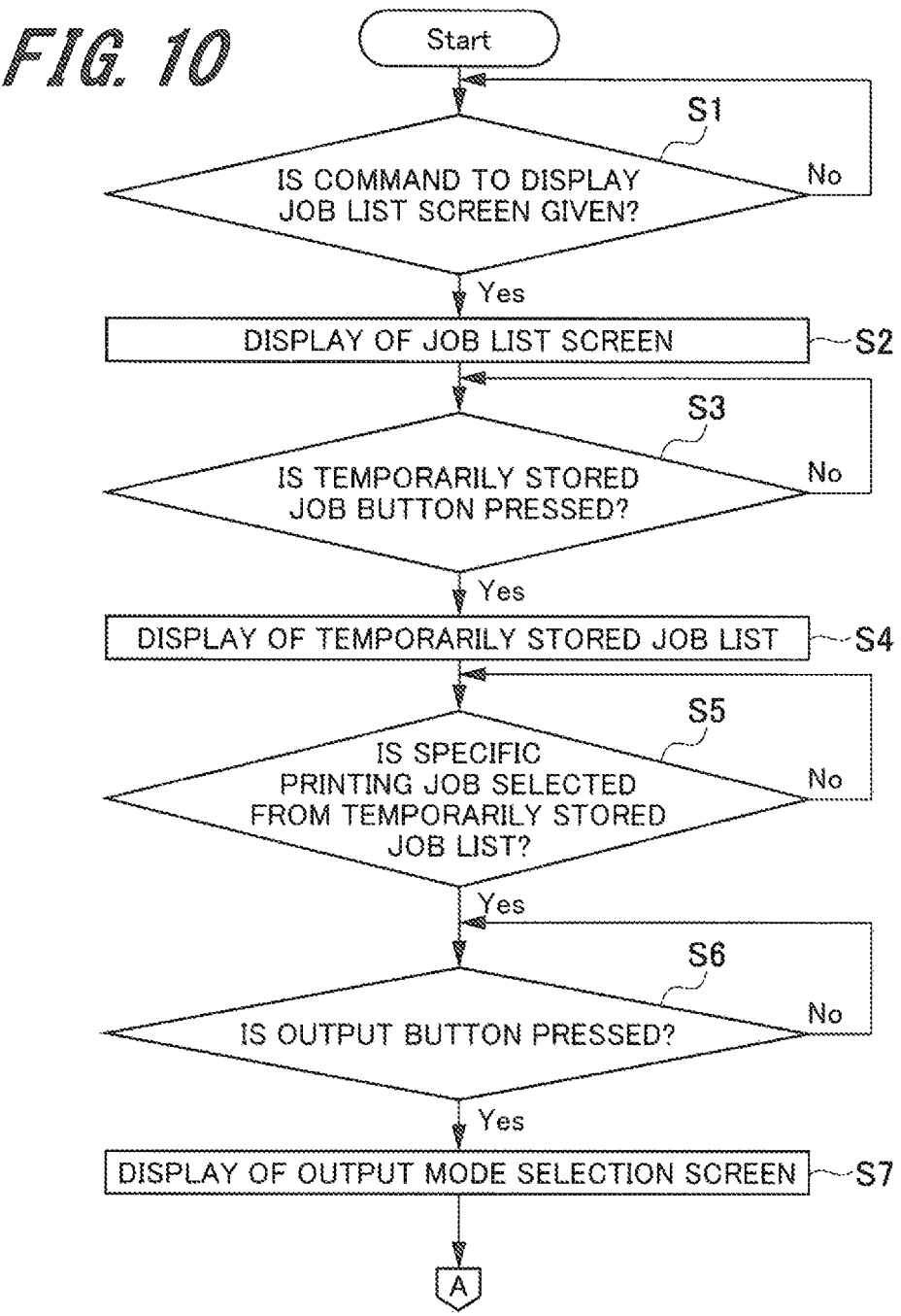
FIG. 10 is a flowchart which shows an example of the sequence of the display control method in the image forming device according to the first embodiment of the present invention.

First, the display controller 150 of the image forming device 10 determines whether a command to display the job list screen Sc2 (see FIG. 5) has been given or not (Step S1 in FIG. 10). If it is determined at Step S1 that the command to display the job list screen Sc2 has not been given (determination at Step S1: NO), the display controller 150 repeats the determination making step S1. On the other hand, if it is determined at Step S1 that the command to display the job list screen Sc2 has been given (determination at Step S1: YES), the display controller 150 performs control for the operation display section 12 to display the job list screen Sc2 (Step S2).

Next, the display controller 150 determines whether the user has pressed the TEMPORARILY STORED JOB button Bn1 (see FIG. 5) or not (Step S3). If it is determined at Step S3 that the TEMPORARILY STORED JOB button Bn1 has not been pressed (determination at Step S3: NO), the display controller 150 repeats the determination making step S3. On the other hand, if it is determined at Step S3 that the TEMPORARILY STORED JOB button Bn1 has been pressed (determination at Step S3: YES), the display controller 150 performs control for the operation display section 12 to display the temporarily stored job list Lt (Step S4).

Next, the display controller 150 determines whether a specific printing job has been selected from the temporarily stored job list Lt or not (Step S5). If it is determined at Step S5 that a specific printing job has not been selected (determination at Step S5: NO), the display controller 150 repeats the determination making step S5. On the other hand, if it is determined at Step S5 that a specific printing job has been selected (determination at Step S5: YES), the display controller 150 determines whether the user has pressed the OUTPUT button Bn2 or not (Step S6).

If it is determined at Step S6 that the OUTPUT button Bn2 has not been pressed (determination at Step S6: NO), the display controller 150 repeats the determination making step S6. On the other hand, it is determined at Step S6 that the OUTPUT button Bn2 has been pressed (determination at Step S6: YES), the display controller 150 performs control for the operation display section 12 to display the OUTPUT MODE SELECTION screen Sc3 (see FIG. 6) (Step S7).

Figure 11:
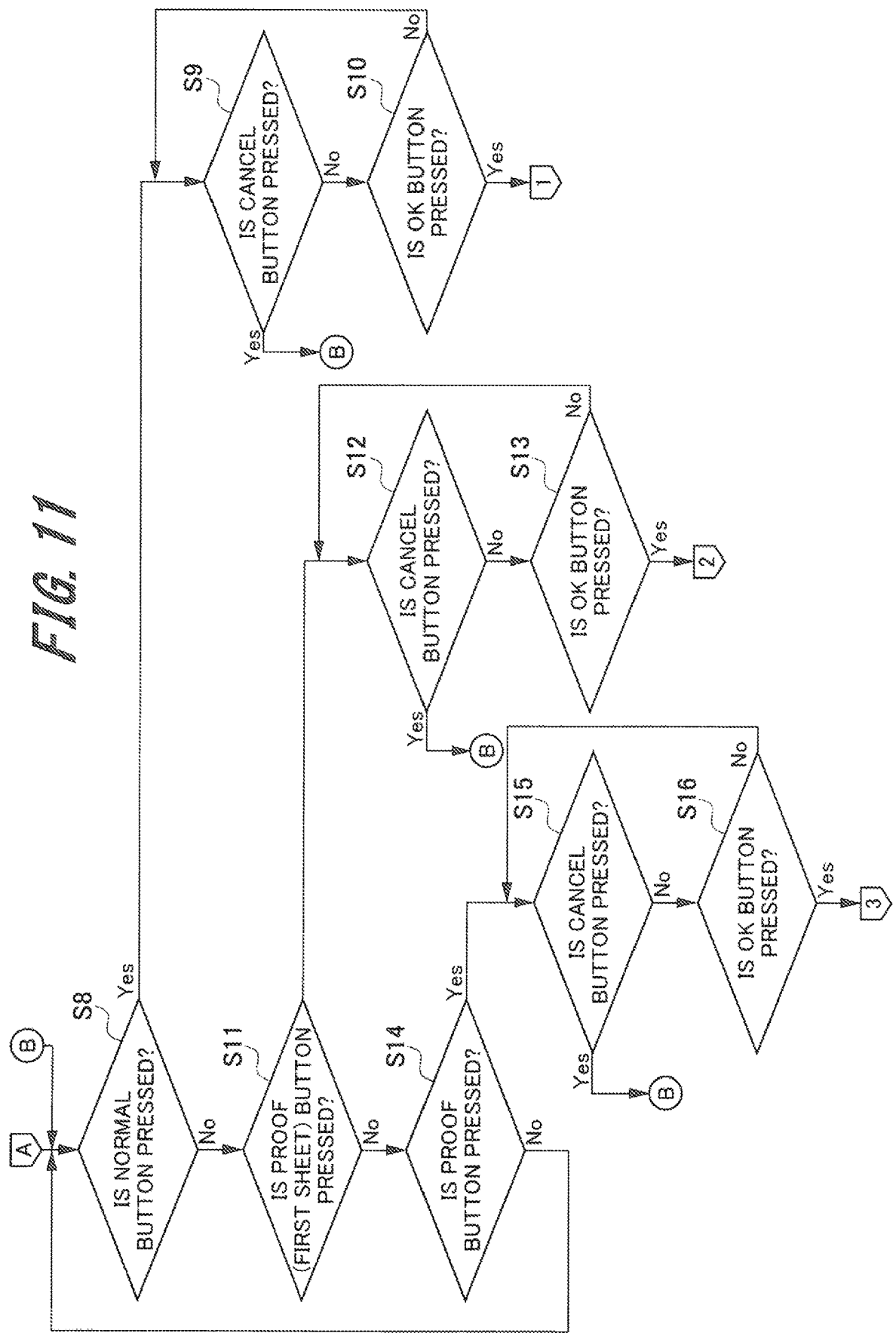
FIG. 11 is a flowchart which shows an example of the sequence of the display control method in the image forming device according to the first embodiment of the present invention.

Next, the display controller 150 determines whether the user has pressed the NORMAL button Bn3 (see FIG. 6) on the OUTPUT MODE SELECTION screen Sc3 or not (Step S8 in FIG. 11). If it is determined at Step S8 that the NORMAL button Bn3 has been pressed (determination at Step S8: YES), the display controller 150 determines whether the CANCEL button has been pressed or not (Step S9). If it is determined at Step S9 that the CANCEL button has been pressed (determination at Step S9: YES), the display controller 150 goes back to Step S8 to make a determination.

On the other hand, it is determined at Step S9 that the CANCEL button has not been pressed (determination at Step S9: NO), the display controller 150 determines whether the OK button Bn6 has been pressed or not (Step S10). If it is determined at Step S10 that the OK button Bn6 has not been pressed (determination at Step S10: NO), the display controller 150 goes back to Step S9 to make a determination. On the other hand, it is determined at Step S10 that the OK button Bn6 has been pressed (determination at Step S10: YES), the display controller 150 performs the process shown in FIG. 12. The process shown in FIG. 12 will be described later.

If it is determined at Step S8 that the NORMAL button Bn3 has not been pressed (determination at Step S8: NO), the display controller 150 determines whether the PROOF (FIRST SHEET) button Bn4 (see FIG. 6) has been pressed or not (Step S11). If it is determined at Step S11 that the PROOF (FIRST SHEET) button Bn4 has been pressed (determination at Step S11: YES), the display controller 150 determines whether the CANCEL button has been pressed or not (Step S12). If it is determined at Step S12 that the CANCEL button has been pressed (determination at Step S12: YES), the display controller 150 goes back to Step S8 to make a determination.

Figure 13:
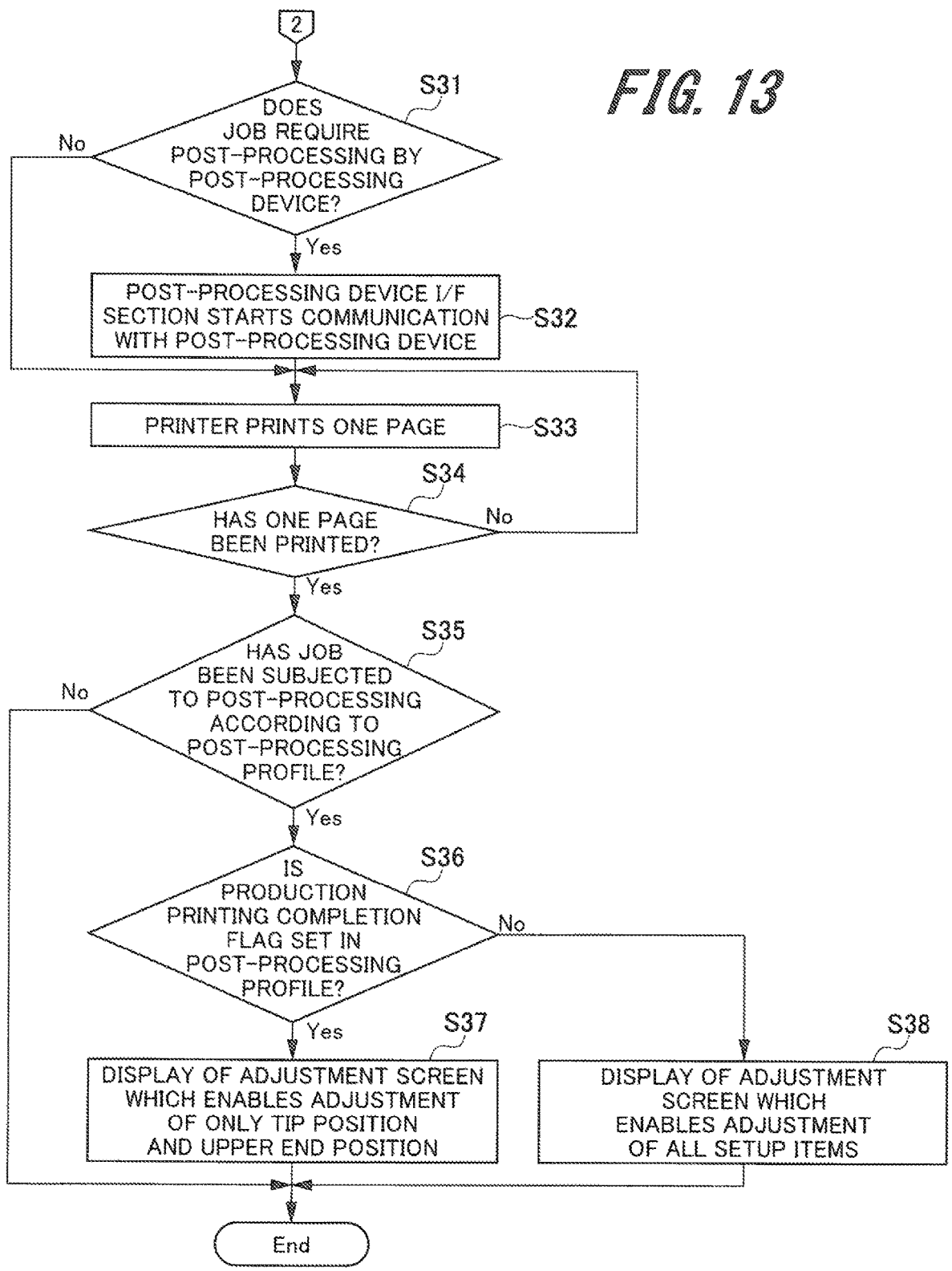
FIG. 13 is a flowchart which shows an example of the sequence of the display control method in the image forming device according to the first embodiment of the present invention.

On the other hand, if it is determined at Step S12 that the CANCEL button has not been pressed (determination at Step S12: NO), the display controller 150 determines whether the OK button Bn6 has been pressed or not (Step S13). If it is determined at Step S13 that the OK button Bn6 has not been pressed (determination at Step S13: NO), the display controller 150 goes back to Step S12 to make a determination. On the other hand, it is determined at Step S13 that the OK button Bn6 has been pressed (determination at Step S13:

YES), the display controller 150 performs the process shown in FIG. 13. The process shown in FIG. 13 will be described later.

If it is determined at Step S11 that the PROOF (FIRST SHEET) button Bn4 has not been pressed (determination at Step S11: NO), the display controller 150 determines whether the PROOF button Bn5 (see FIG. 6) has been pressed or not (Step S14). If it is determined at Step S14 that the PROOF button Bn5 has been pressed (determination at Step S14: YES), the display controller 150 determines whether the CANCEL button has been pressed or not (Step S15). If it is determined at Step S15 that the CANCEL button has been pressed (determination at Step S15: YES), the display controller 150 goes back to Step S8 to make a determination.

On the other hand, if it is determined at Step S15 that the CANCEL button has not been pressed (determination at Step S15: NO), the display controller 150 determines whether the OK button Bn6 has been pressed or not (Step S16). If it is determined at Step S16 that the OK button Bn6 has not been pressed (determination at Step S16: NO), the display controller 150 goes back to Step S15 to make a determination. On the other hand, it is determined at Step S16 that the OK button Bn6 has been pressed (determination at Step S16: YES), the display controller 150 performs the process shown in FIG. 14. The process shown in FIG. 14 will be described later.

Figure 12:
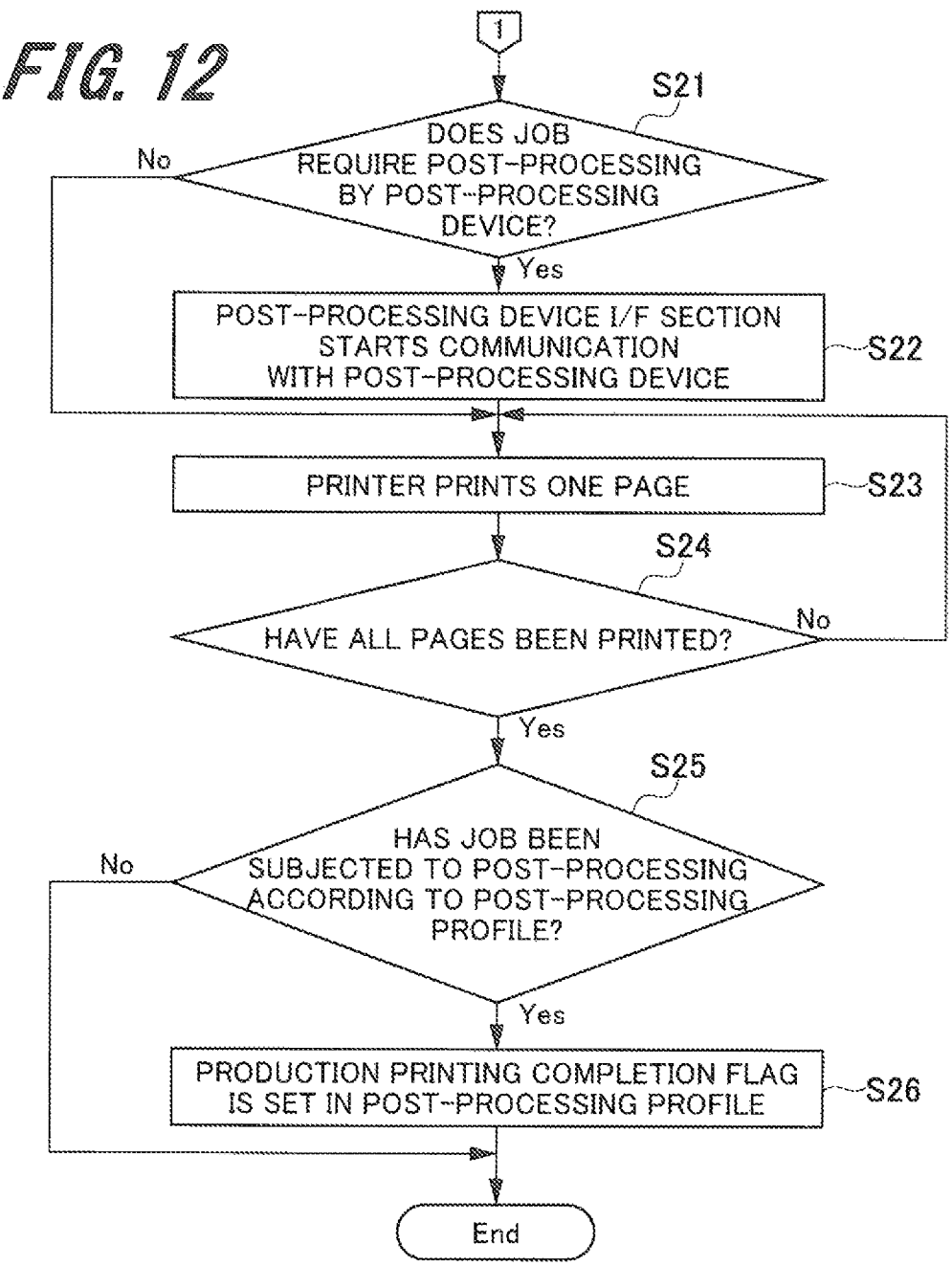
FIG. 12 is a flowchart which shows an example of the sequence of the display control method in the image forming device according to the first embodiment of the present invention.

Next, referring to FIG. 12, an explanation will be given of the processing sequence in the case that the OK button Bn6 is pressed after the NORMAL button Bn3 is pressed (when the determination at Step S10 in FIG. 11 is YES).

First, the controller 100 of the image forming device 10 determines whether the printing job for which a printing command is given by pressing the NORMAL button Bn3 requires post-processing by the post-processing device 20 or not (Step S21). If it is determined at Step S21 that the job requires post-processing (determination at Step S21: YES), the post-processing device I/F section 130 (see FIG. 2) starts communication with the post-processing device 20 (Step S22).

Then, the printer 14 prints one page (Step S23). Even if it is determined at Step S21 that the job does not require post-processing by the post-processing device 20 (determination at Step S21: NO), Step S23 is carried out. Then, the controller 100 determines whether all the pages of the printing job have been printed or not (Step S24). If it is determined at Step S24 that all the pages have not been printed (determination at Step S24: NO), the controller 100 goes back to Step S23. In other words, the printer 14 prints one page.

On the other hand, if it is determined at Step S24 that all the pages have been printed (determination at Step S24: YES), the controller 100 determines whether the job for which printing has been completed is a job subjected to post-processing according to the post-processing profile 111 or not (Step S25).

If it is determined at Step S25 that the job has been subjected to post-processing (determination at Step S25: YES), the controller 100 sets the production printing completion flag in the post-processing profile 111 (Step S26). After Step S26 is taken, the display control process is ended. Even if it is determined at Step S25 that the job has not been subjected to post-processing (determination at Step S25: NO), the display control process is ended.

Next, referring to FIG. 13, an explanation will be given of the processing sequence in the case that the OK button Bn6 is pressed after the PROOF (FIRST SHEET) button Bn4 is pressed (when the determination at Step S13 in FIG. 11 is YES).

First, the controller 100 of the image forming device 10 determines whether the printing job for which a printing command is given by pressing the PROOF (FIRST SHEET) button Bn4 requires post-processing by the post-processing device 20 or not (Step S31). If it is determined at Step S31 that the job requires post-processing (determination at Step S31: YES), the post-processing device I/F section 130 starts communication with the post-processing device 20 (Step S32).

Then, the printer 14 prints one page (Step S33). Even if it is determined at Step S31 that the job does not require post-processing by the post-processing device 20 (determination at Step S31: NO), Step S33 is carried out. Then, the controller 100 determines whether one page for the printing job has been printed or not (Step S34). If it is determined at Step S34 that one page has not been printed (determination at Step S34: NO), the controller 100 goes back to Step S33. In other words, the printer 14 prints one page.

On the other hand, if it is determined at Step S34 that one page has been printed (determination at Step S34: YES), the controller 100 determines whether the job for which one page has been printed is a job subjected to post-processing according to the post-processing profile 111 or not (Step S35). If it is determined at Step S35 that the job has not been subjected to post-processing (determination at Step S35: NO), the controller 100 ends the display control process.

On the other hand, if it is determined at Step S35 that the job has been subjected to post-processing (determination at Step S35: YES), the controller 100 determines whether the production printing completion flag has been set in the post-processing profile 111 or not (Step S36).

If it is determined at Step S36 that the production printing completion flag has been set (determination at Step S36: YES), the display controller 150 performs control for the operation display section 12 to display the adjustment screen Sc4 (see FIG. 7) which enables adjustment of only the tip position and upper end position in image formation on the sheet Sh (Step S37). After Step S37 is taken, the display control process is ended.

On the other hand, if it is determined at Step S36 that the production printing completion flag has not been set (determination at Step S36: NO), the display controller 150 performs control for the operation display section 12 to display the adjustment screen Sc5 (see FIG. 8) which enables adjustment of all setup items (Step S38). After Step S38 is taken, the display control process is ended.

Figure 14:
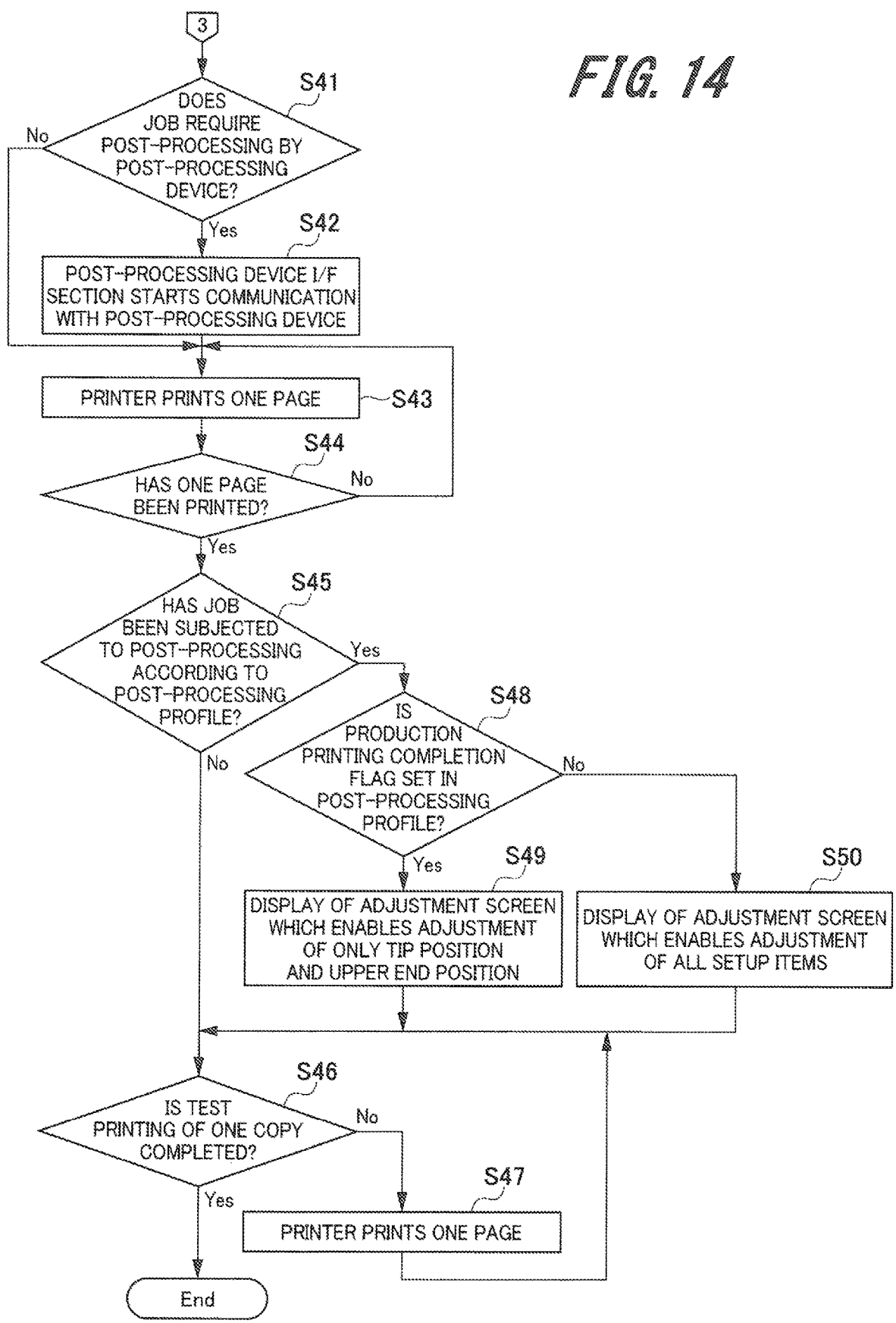
FIG. 14 is a flowchart which shows an example of the sequence of the display control method in the image forming device according to the first embodiment of the present invention.

Next, referring to FIG. 14, an explanation will be given of the processing sequence in the case that the OK button Bn6 is pressed after the PROOF button Bn5 is pressed (when the determination at Step S16 in FIG. 11 is YES).

First, the controller 100 of the image forming device 10 determines whether the printing job for which a printing command is given by pressing the PROOF button Bn5 requires post-processing by the post-processing device 20 or not (Step S41). If it is determined at Step S41 that the job requires post-processing (determination at Step S41: YES), the post-processing device I/F section 130 starts communication with the post-processing device 20 (Step S42).

Then, the printer 14 prints one page (Step S43). Even if it is determined at Step S41 that the job does not require post-processing by the post-processing device 20 (determination at Step S41: NO), Step S43 is carried out. Then, the controller 100 determines whether one page for the printing job has been printed or not (Step S44). If it is determined at Step S44 that one page has not been printed (determination at Step S44: NO), the controller 100 goes back to Step S43. In other words, the printer 14 prints one page.

On the other hand, if it is determined at Step S44 that one page has been printed (determination at Step S44: YES), the controller 100 determines whether the job for which one page has been printed is a job subjected to post-processing according to the post-processing profile 111 or not (Step S45).

If it is determined at Step S45 that the job has not been subjected to post-processing (determination at Step S45: NO), the controller 100 determines whether test printing of one copy has been completed or not (step S46). If it is determined at Step S46 that test printing of one copy has not been completed (determination at Step S46: NO), the printer 14 prints one page (Step S47). After Step S47 is taken, the controller 100 makes a determination at Step S46. On the other hand, if it is determined at Step S46 that test printing of one copy has been completed (determination at Step S46: YES), the display control process is ended.

If it is determined at Step S45 that the job has been subjected to post-processing (determination at Step S45: YES), the controller 100 determines whether the production printing completion flag has been set in the post-processing profile 111 or not (Step S48).

If it is determined at Step S48 that the production printing completion flag has been set (determination at Step S48: YES), the display controller 150 performs control for the operation display section 12 to display the adjustment screen Sc4 (see FIG. 7) which enables adjustment of only the tip position and upper end position in image formation on the sheet Sh (Step S49). After Step S49 is taken, the controller 100 makes a determination at Step S46.

On the other hand, if it is determined at Step S48 that the production printing completion flag has not been set (determination at Step S48: NO), the display controller 150 performs control for the operation display section 12 to display the adjustment screen Sc5 (see FIG. 8) which enables adjustment of all setup items (Step S50). After Step S50 is taken, the controller 100 makes a determination at Step 46.

In the first embodiment, when the printer 14 conducts test printing according to a printing job to which the post-processing profile 111 is applied, the display controller 150 causes the adjustment screen Sc4 of the operation display section 12 to show some of the setup items included in the post-processing profile 111. Therefore, according to the present embodiment, the user can easily adjust the post-processing profile 111 applied to the printing job.

In the first embodiment, the display controller 150 performs control for the adjustment screen Sc4 of the operation display section 12 to show some of the setup items included in the post-processing profile 111 during test printing or after test printing. Consequently, the user can check the finish of the test-printed output before adjusting the setup items in the post-processing profile 111.

Furthermore, in the first embodiment, if production printing according to the printing job to which the post-processing profile 111 is applied has not been completed, the display controller 150 performs control for the adjustment screen Sc5 to show all the setup items included in the post-processing profile 111. Consequently, the user can freely adjust the setup items in the post-processing profile 111 while production printing is not completed.

Furthermore, in the first embodiment, if production printing according to the printing job to which the post-processing profile 111 is applied has been completed, the display controller 150 performs control for the adjustment screen Sc4 to show the following setup items among the setup items included in the post-processing profile 111: the setup item to adjust position Ps1 of the first side as one of the sides of the sheet Sh parallel to the CD direction perpendicular to the FD direction and the setup item to adjust position Ps2 of the second side as a side perpendicular to the first side. As an adjustment of the post-processing profile 111 after completion of production printing, a fine adjustment is often made to correct slight sheet misalignment attributable to the individual difference of the image forming device 10 or the like. Therefore, according to the present embodiment, the user can easily make the fine adjustment of the post-processing profile 111 which is required after completion of production printing.

Second Embodiment

[Configuration of the Printing System]

Figure 15:
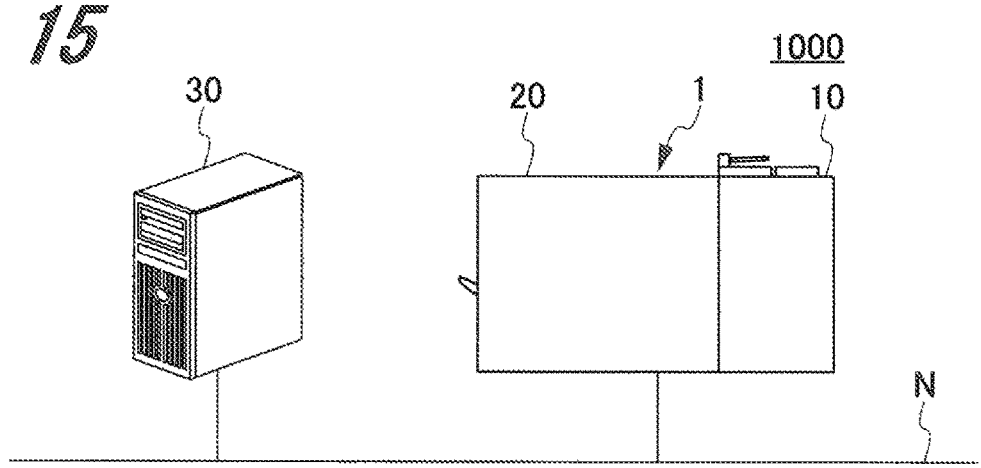
FIG. 15 is a schematic configuration diagram of the printing system according to a second embodiment of the present invention.

Next, referring to FIG. 15, an explanation will be given of the configuration of the printing system including an image forming system according to a second embodiment. FIG. 15 is a schematic configuration diagram of a printing system 1000.

As shown in FIG. 15, the printing system 1000 includes an image forming system 1 including an image forming device 10 and a post-processing device 20, and a printing instruction device 30 (an example of an information processing device). The image forming system 1 and the printing instruction device 30 are connected through a network N.

The configuration of the image forming system 1 is the same as the one in the first embodiment, so its description is omitted here. The printing instruction device 30 controls the printing job and supplies a printing job to the image forming device 10.

[Configuration of the Control System of the Printing Instruction Device]

Figure 16:
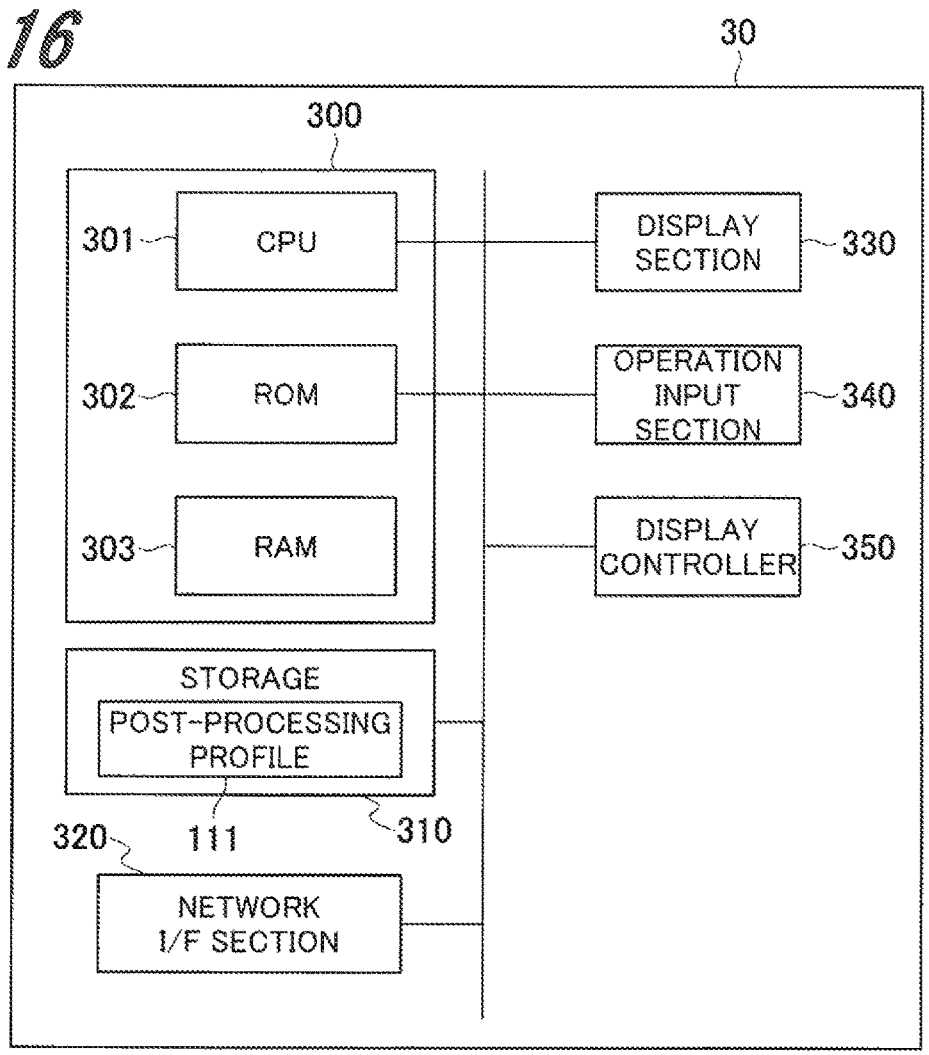
FIG. 16 is a block diagram which shows an example of the configuration of the control system of the printing instruction device according to the second embodiment of the present invention.

Next, referring to FIG. 16, an explanation will be given of an example of the configuration of the control system of the printing instruction device 30. FIG. 16 is a block diagram which shows an example of the configuration of the control system of the printing instruction device 30.

As shown in FIG. 16, the printing instruction device 30 includes a controller 300, a storage 310, a network I/F section 320, a display section 330, an operation input section 340, and a display controller 350.

The controller 300 includes a CPU 301, a ROM 302, and a RAM 303. The CPU 301 controls operation of various sections of the printing instruction device 30. For example, the CPU 301 changes the content of the post-processing setup profile according to the instruction from the user concerning the content of the adjustment screen displayed on the display section 330.

The ROM 302 stores the program (software) for the CPU 301 to perform arithmetic processing. The RAM 303 is used as a working area for the CPU 301 to execute the program. The storage 310 is, for example, an HDD, an SSD or the like. The storage 310 stores the post-processing profile 111.

The network I/F section 320 is a NIC, a modem or the like and connected to the public circuit (not shown) or the like. The network I/F section 320 receives original data or the like sent from a terminal or the like (not shown) which is operated by the user.

The display section 330 is a liquid crystal panel or the like which displays an adjustment screen or the like for the post-processing profile under the control by the display controller 350. The operation input section 340 includes a UI (User Interface) such as a mouse or a keyboard and generates an operation signal corresponding to the operation by the user using the UI and sends the operation signal to the controller 300.

The display controller 350 performs control for the display section 330 to display a screen such as an operation screen according to the operation command entered by the user through the operation input section 340. For example, the display controller 350 performs control for the display section 330 to display an adjustment screen when the image forming device 10 conducts test printing according to the printing job to which the post-processing profile 111 is applied. At this time, the display controller 350 changes the content shown on the adjustment screen according to information about whether production printing for the printing job has been completed or not. Specifically, if production printing has been completed, the display controller 350 performs control for the adjustment screen (adjustment screen Sc4 in FIG. 7) to show some of the setup items included in the post-processing profile 111. If production printing has not been completed, the display controller 350 performs control for the adjustment screen (adjustment screen Sc5 in FIG. 9) to show all the setup items included in the post-processing profile 111.

[Display Control Method in the Printing System]

Figure 17:
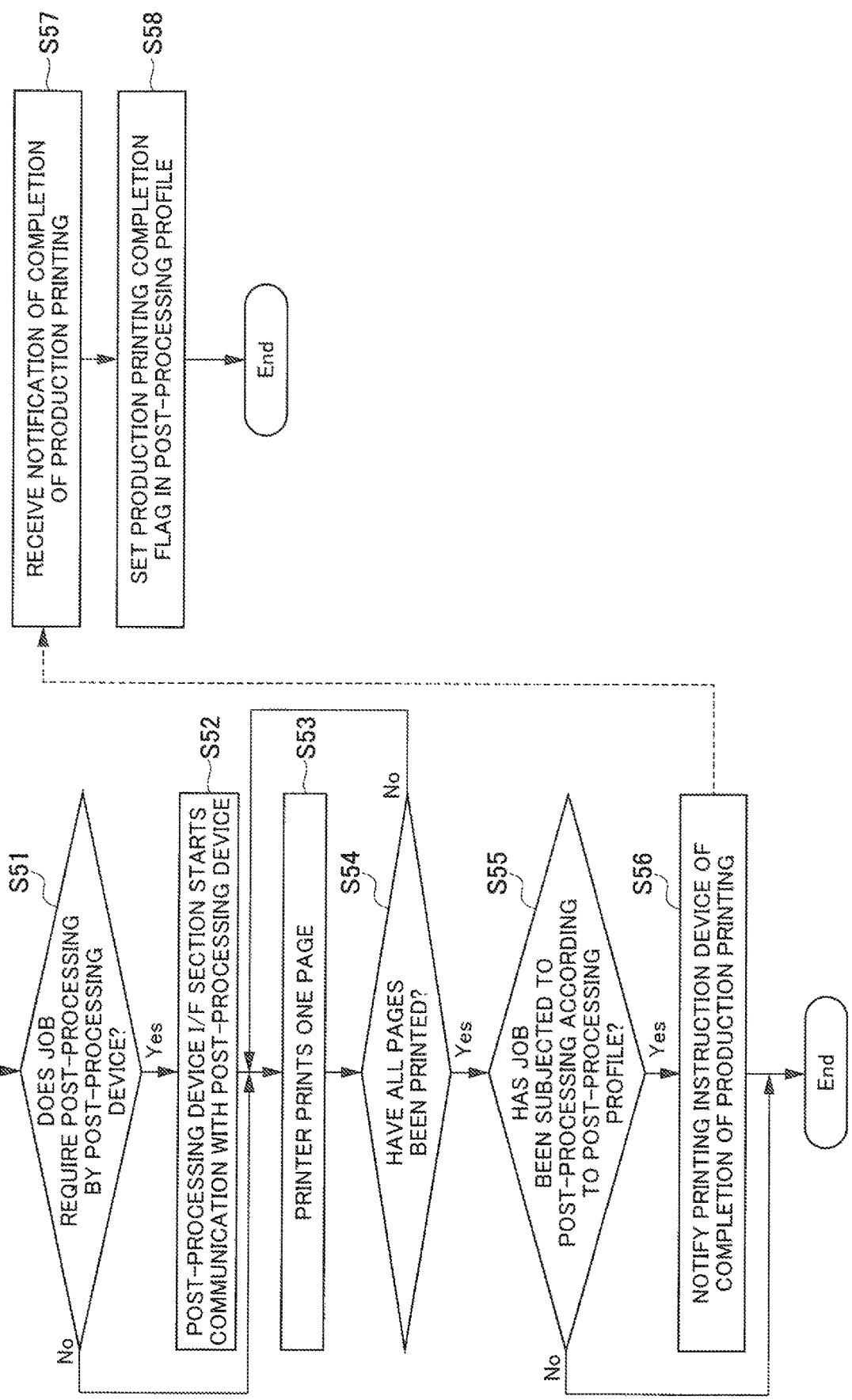
FIG. 17 is a flowchart which shows an example of the sequence of the display control method in the printing system according to the second embodiment of the present invention.
Figure 18:
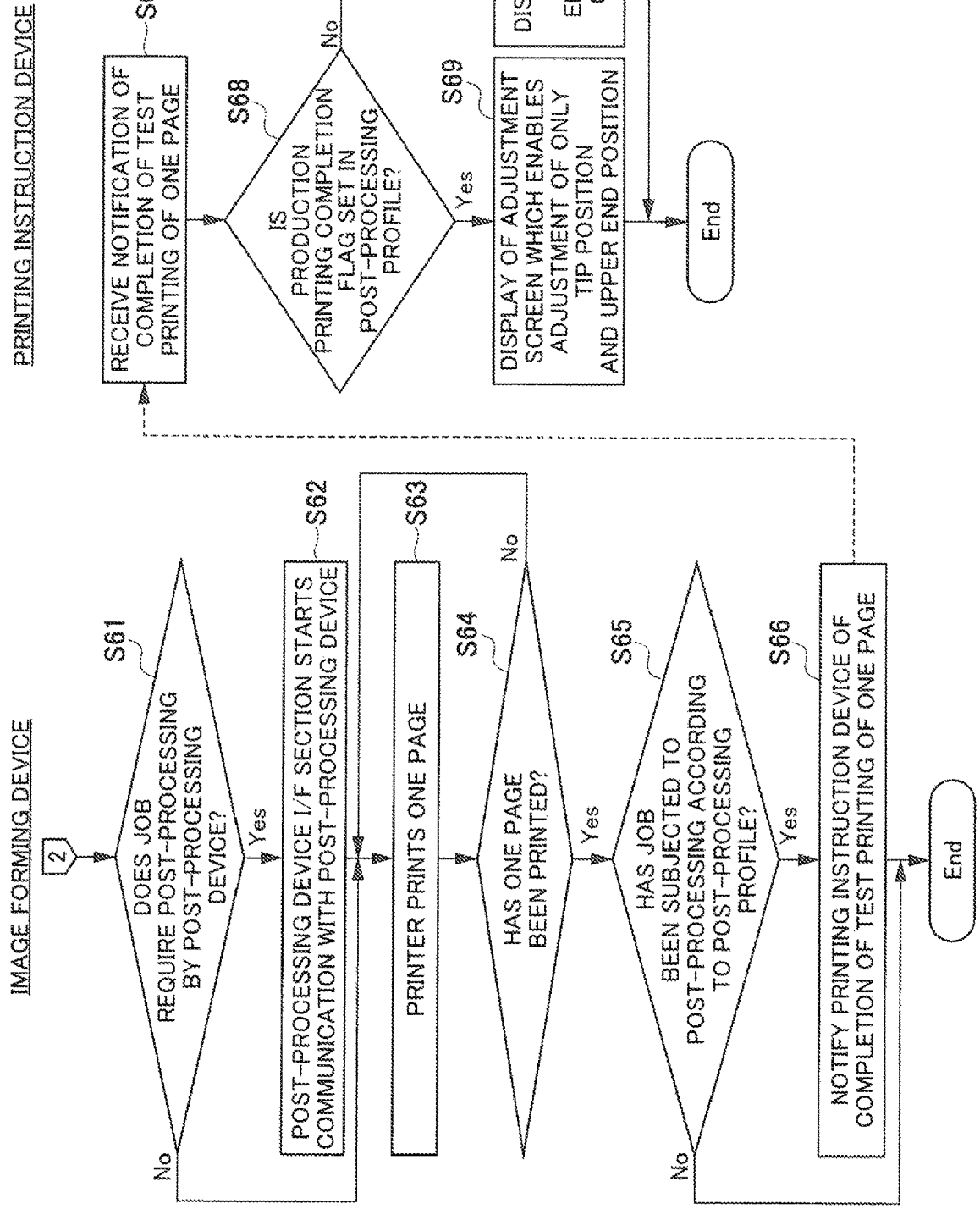
FIG. 18 is a flowchart which shows an example of the sequence of the display control method in the printing system according to the second embodiment of the present invention.
Figure 19:
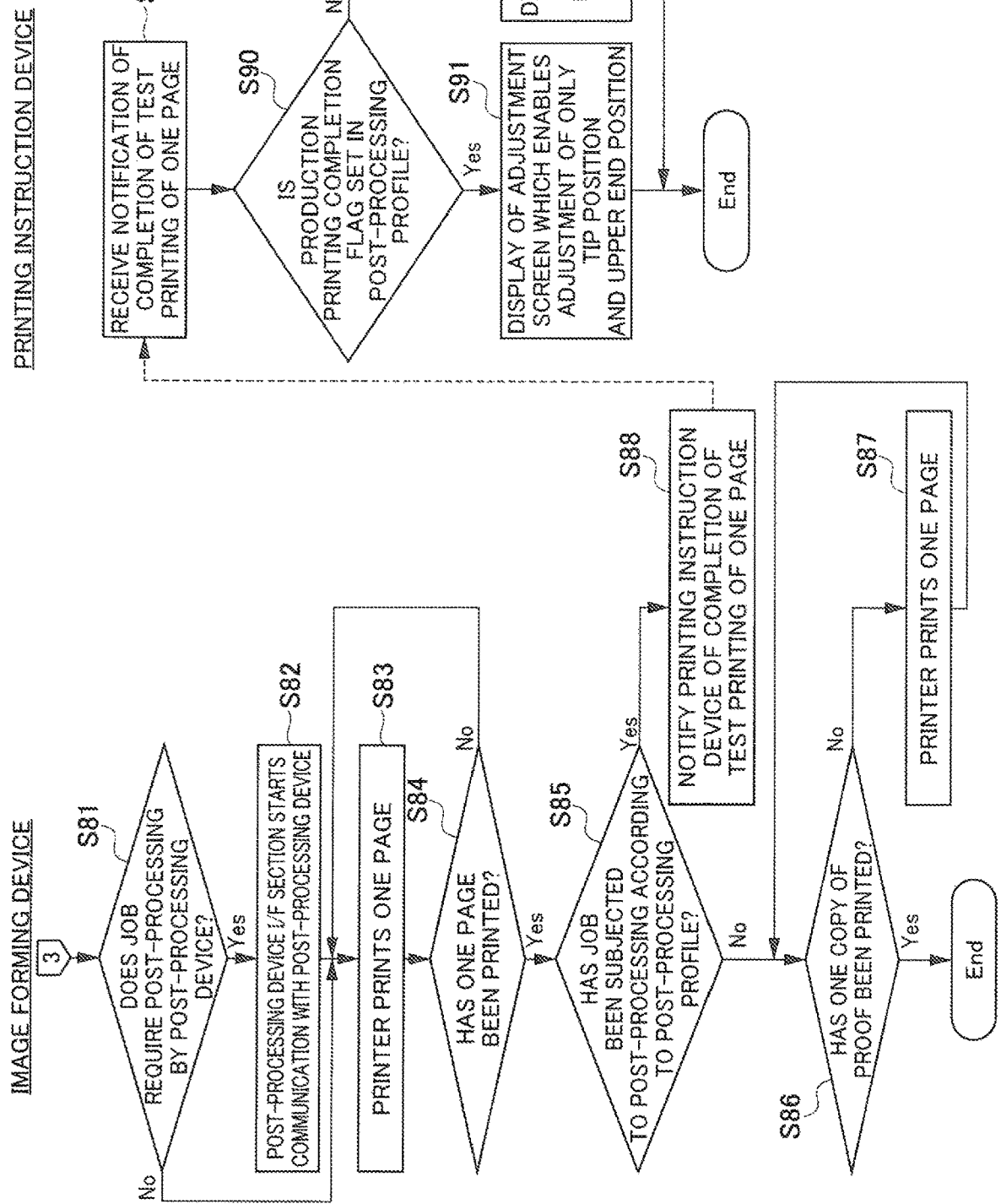
FIG. 19 is a flowchart which shows an example of the sequence of the display control method in the printing system according to the second embodiment of the present invention.

Next, the display control method in the printing system 1000 will be described referring to FIGS. 17 to 19. FIGS. 17 to 19 are flowcharts which show an example of the sequence of the display control method in the printing system 1000.

First, the image forming device 10 of the printing system 1000 performs the processing sequences as shown in FIGS. 10 and 11. The processing sequences in FIGS. 10 and 11 have already been explained, so their description is omitted here.

Next, referring to FIG. 17, an explanation will be given of the processing sequence in the case that the OK button Bn6 is pressed after the NORMAL button Bn3 (see FIG. 6) is pressed (when the determination at Step S10 in FIG. 11 is YES).

First, the controller 100 of the image forming device 10 determines whether the printing job for which a printing command is given by pressing the NORMAL button Bn3 requires post-processing by the post-processing device 20 or not (Step S51). If it is determined at Step S51 that the job requires post-processing (determination at Step S51: YES), the post-processing device I/F section 130 (see FIG. 2) starts communication with the post-processing device 20 (Step S52).

Then, the printer 14 prints one page (Step S53). Even if it is determined at Step S51 that the job does not require post-processing by the post-processing device 20 (determination at Step S51: NO), Step S53 is carried out. Then, the controller 100 determines whether all the pages for the printing job have been printed or not (Step S54). If it is determined at Step S54 that all the pages have not been printed (determination at Step S54: NO), the controller 100 goes back to Step S53. In other words, the printer 14 prints one page.

On the other hand, if it is determined at Step S54 that all the pages have been printed (determination at Step S54: YES), the controller 100 determines whether the job for which printing has been completed is a job subjected to post-processing according to the post-processing profile 111 or not (Step S55). If it is determined at Step S55 that the job has not been subjected to post-processing according to the post-processing profile 111 (determination at Step S55: NO), the controller 100 ends the display control process.

On the other hand, if it is determined at Step S55 that the job has been subjected to post-processing (determination at Step S55: YES), the controller 100 notifies the printing instruction device 30 of completion of production printing through the network I/F section 320 (Step S56).

As the printing instruction device 30 receives the notification of completion of production printing from the image forming device 10 (Step S57), it sets the production printing completion flag in the post-processing profile 111 stored in the storage 310 (Step S58). After Step S58 is taken, the display control process is ended.

Next, referring to FIG. 18, an explanation will be given of the processing sequence in the case that the OK button Bn6 is pressed after the PROOF (FIRST SHEET) button Bn4 (see FIG. 6) is pressed (when the determination at Step S13 in FIG. 11 is YES).

First, the controller 100 of the image forming device 10 determines whether the printing job for which a printing command is given by pressing the PROOF (FIRST SHEET) button Bn4 requires post-processing by the post-processing device 20 or not (Step S61). If it is determined at Step S61 that the job requires post-processing (determination at Step S61: YES), the post-processing device I/F section 130 starts communication with the post-processing device 20 (Step S62).

Then, the printer 14 prints one page (Step S63). Even if it is determined at Step S61 that the job does not require post-processing by the post-processing device 20 (determination at Step S61: NO), Step S63 is carried out. Then, the controller 100 determines whether one page for the printing job has been printed or not (Step S64). If it is determined at Step S64 that one page has not been printed (determination at Step S64: NO), the controller 100 goes back to Step S63. In other words, the printer 14 prints one page.

On the other hand, if it is determined at Step S64 that one page has been printed (determination at Step S64: YES), the controller 100 determines whether the job for which one page has been printed is a job subjected to post-processing according to the post-processing profile 111 or not (Step S65). If it is determined at Step S65 that the job has not been subjected to post-processing according to the post-processing profile 111 (determination at Step S65: NO), the controller 100 ends the display control process.

On the other hand, if it is determined at Step S65 that the job has been subjected to post-processing (determination at Step S65: YES), the controller 100 notifies the printing instruction device 30 of completion of test printing of one page through the network I/F section 320 (Step S66).

The printing instruction device 30 receives the notification of completion of test printing of one page (Step S67). Then, the controller 300 of the printing instruction device 30 determines whether the production printing completion flag has been set in the post-processing profile 111 stored in the storage 310 or not (Step S68).

If it is determined at Step S68 that the production printing completion flag has been set (determination at Step S68: YES), the display controller 350 performs control for the display section 330 to display the adjustment screen Sc4 (see FIG. 7) which enables adjustment of only the tip position and upper end position in image formation on the sheet Sh (Step S69). After Step S69 is taken, the display control process is ended.

On the other hand, if it is determined at Step S68 that the production printing completion flag has not been set (determination at Step S68: NO), the display controller 150 performs control for the display section 330 to display the adjustment screen Sc5 (see FIG. 8) which enables adjustment of all setup items (Step S70). After Step S70 is taken, the display control process is ended.

Next, referring to FIG. 19, an explanation will be given of the processing sequence in the case that the OK button Bn6 is pressed after the PROOF button Bn5 (see FIG. 6) is pressed (when the determination at Step S16 in FIG. 11 is YES).

First, the controller 100 of the image forming device 10 determines whether the printing job for which a printing command is given by pressing the PROOF button Bn5 requires post-processing by the post-processing device 20 or not (Step S81). If it is determined at Step S81 that the job requires post-processing (determination at Step S81: YES), the post-processing device I/F section 130 starts communication with the post-processing device 20 (Step S82).

Then, the printer 14 prints one page (Step S83). Even if it is determined at Step S81 that the job does not require post-processing by the post-processing device 20 (determination at Step S81: NO), Step S83 is carried out. Then, the controller 100 determines whether one page for the printing job has been printed or not (Step S84). If it is determined at Step S84 that one page has not been printed (determination at Step S84: NO), the controller 100 goes back to Step S83. In other words, the printer 14 prints one page.

On the other hand, if it is determined at Step S84 that one page has been printed (determination at Step S84: YES), the controller 100 determines whether the job for which one page has been printed is a job subjected to post-processing according to the post-processing profile 111 or not (Step S85).

If it is determined at Step S85 that the job has not been subjected to post-processing (determination at Step S85: NO), the controller 100 determines whether test printing of one copy has been completed or not (step S86). If it is determined at Step S86 that test printing of one copy has not been completed (determination at Step S86: NO), the printer 14 prints one page (Step S87). After Step S87 is taken, the controller 100 makes a determination at Step S86. On the other hand, if it is determined at Step S86 that test printing of one copy has been completed (determination at Step S86: YES), the display control process is ended.

If it is determined at Step S85 that the job has been subjected to post-processing (determination at Step S85: YES), the controller 100 notifies the printing instruction device 30 of completion of test printing of one page through the network I/F section 320 (Step S88).

The printing instruction device 30 receives the notification of completion of test printing of one page (Step S89). Then, the controller 300 of the printing instruction device 30 determines whether the production printing completion flag has been set in the post-processing profile 111 stored in the storage 310 (Step S90).

If it is determined at Step S90 that the production printing completion flag has been set (determination at Step S90: YES), the display controller 350 performs control for the display section 330 to display the adjustment screen Sc4 (see FIG. 7) which enables adjustment of only the tip position and upper end position in image formation on the sheet Sh (Step S91). After Step S91 is taken, the display control process is ended.

On the other hand, if it is determined at Step S90 that the production printing completion flag has not been set (determination at Step S90: NO), the display controller 350 performs control for the display section 330 to display the adjustment screen Sc5 (see FIG. 8) which enables adjustment of all setup items (Step S92). After Step S92 is taken, the display control process is ended.

The second embodiment also brings about the same advantageous effects as the first embodiment.

Although in the second embodiment it is assumed that the adjustment screen to adjust the post-processing profile 111 is displayed on the display section 330 of the printing instruction device 30, the present invention is not limited thereto. Alternatively, by sending an instruction from the printing instruction device 30 to the image forming device 10, the adjustment screen may be displayed on the operation display section 12 of the image forming device 10.

Furthermore, although in the second embodiment it is assumed that the information processing device according to the present invention is applied to the printing instruction device 30, the present invention is not limited thereto. Alternatively, the information processing device according to the present invention may be applied to another type of device such as a file management server, provided that the device can manage the post-processing profile 111.

<Various Modifications>

The present invention is not limited to the above embodiments but the invention may be embodied or applied in other various forms without departing from the gist of the invention as described in the appended claims.

For example, in the above embodiments, it is assumed that the positions which can be adjusted on the adjustment screen Sc4 (see FIG. 7) displayed on the operation display section 12 (see FIG. 2) or the display section 330 (see FIG. 16) at the time of completion of production printing are the tip position Ps1 and upper end position Ps2 as shown in FIG. 8. However, the present invention is limited thereto. Instead, the positions which can be adjusted at the time of completion of production printing may be any positions other than the tip position Ps1 and upper end position Ps2, provided that they are the position of the first side as one of the sides of the image formed on the sheet Sh which are parallel to the CD direction perpendicular to the FD direction and the position of the second side as a side perpendicular to the first side.

The device and system configurations of the above embodiments have been described in detail concretely for easy understanding of the present invention; however, the present invention is not limited to a configuration which includes all the elements described above. For each embodiment, addition, deletion, or replacement of an element can be made. Also, the control lines and data lines indicated by solid lines in FIGS. 2 and 16 are considered as required for explanation and do not cover all the control lines and data lines in the product. It may be considered that almost all constituent elements are connected to each other actually.

Although embodiments of the present invention have been described and illustrated in detail, the disclosed embodiments are made for purposes of illustration and example only and not limitation. The scope of the present invention should be interpreted by terms of the appended claims.

REFERENCE SIGNS LIST

1 . . . image forming system,
10 . . . image forming device,
12 . . . operation display section,
14 . . . printer,
20 . . . post-processing device,
21 . . . FD trimming section,
22 . . . second post-processor, 23 . . . third post-processor,
24 . . . CD trimming section,
30 . . . printing instruction device,
100 . . . controller,
110 . . . storage,
111 . . . post-processing profile,
120 . . . network I/F section,
130 . . . post-processing device I/F section,
150 . . . display controller,
221 . . . creasing section,
222 . . . CD perforating section,
231 . . . FD perforating section,
232 . . . bleed slitting section,
300 . . . controller,
310 . . . storage,
320 . . . network I/F section,
330 . . . display section,
340 . . . operation input section,
350 . . . display controller,
1000 . . . printing system,
Sc4, Sc5 . . . adjustment screen

What is claimed is:

1. An image forming device comprising:
an image forming section which forms an image on recording paper;
a storage which stores post-processing setup information as setup information for post-processing including trimming to be performed by a post-processing device on the recording paper on which the image has been formed by the image forming section; and
a display controller which performs
(i) control for an adjustment screen of a display section to show only some among all of setup items included in the post-processing setup information when test printing according to a printing job to which the post-processing setup information is applied is conducted by the image forming section,
(ii) control for the adjustment screen to show all of the setup items included in the post-processing setup information when production printing according to the printing job to which the post-processing setup information is applied is not completed, and
(iii) control for the adjustment screen to show only a subset of all of the setup items included in the post-processing setup information when the production printing according to the printing job to which the post-processing setup information is applied has been completed.

2. The image forming device according to claim 1, wherein the display controller causes the only some among all of the setup items to be shown on the adjustment screen while the test printing is conducted or after the test printing is conducted.

3. The image forming device according to claim 2, wherein, when the production printing according to the printing job to which the post-processing setup information is applied is completed, the display controller performs control for the adjustment screen to show, among the setup items included in the post-processing setup information, a setup item to adjust a position of a first side as one of sides of the image formed on the recording paper which are parallel to a direction perpendicular to a direction of transportation of the recording paper and a setup item to adjust a position of a second side as a side perpendicular to the first side.

4. An information processing device comprising:
a storage which stores post-processing setup information as setup information for post-processing including trimming to be performed by a post-processing device on recording paper on which an image has been formed; and
a display controller which performs
(i) control for an adjustment screen of a display section to show only some among all of setup items included in the post-processing setup information when test printing according to a printing job to which the post-processing setup information is applied is conducted by an image forming device for forming an image on the recording paper,
(ii) control for the adjustment screen to show all of the setup items included in the post-processing setup information when production printing according to the printing job to which the post-processing setup information is applied is not completed, and
(iii) control for the adjustment screen to show only a subset of all of the setup items included in the post-processing setup information when the production printing according to the printing job to which the post-processing setup information is applied has been completed.

5. A display control method which uses a non-transitory computer-readable recording medium storing a program causing a computer to perform:
forming an image on recording paper;
controlling post-processing setup information as setup information for post-processing including trimming to be performed by a post-processing device on the recording paper on which the image has been formed;
performing control for an adjustment screen of a display section to show only some among all of setup items included in the post-processing setup information when test printing according to a printing job to which the post-processing setup information is applied is conducted;
performing control for the adjustment screen to show all of the setup items included in the post-processing setup information when production printing according to the printing job to which the post-processing setup information is applied is not completed; and
performing control for the adjustment screen to show only a subset of all of the setup items included in the post-processing setup information when the production printing according to the printing job to which the post-processing setup information is applied has been completed.

6. A non-transitory computer-readable recording medium storing a program causing a computer to perform:
forming an image on recording paper;
controlling post-processing setup information as setup information for post-processing including trimming to be performed by a post-processing device on the recording paper on which the image has been formed;
performing control for an adjustment screen of a display section to show only some among all of setup items included in the post-processing setup information when test printing according to a printing job to which the post-processing setup information is applied is conducted;
performing control for the adjustment screen to show all of the setup items included in the post-processing setup information when production printing according to the printing job to which the post-processing setup information is applied is not completed; and performing control for the adjustment screen to show only a subset of all of the setup items included in the post-processing setup information when the production printing according to the printing job to which the post-processing setup information is applied has been completed.

* * * * *